United States Patent [19]

Crocoli

[11] Patent Number: 4,868,936
[45] Date of Patent: Sep. 26, 1989

[54] SANITARY FITTINGS AND TO COLLECTING TANKS, VALVES AND WCS, PARTICULARLY SUITABLE FOR USE IN CAMPERS, CARAVANS AND DOMESTIC DWELLINGS

[76] Inventor: Pietro Crocoli, Via Flippo Serafini, 33-Rome, Italy

[21] Appl. No.: 141,196

[22] Filed: Jan. 6, 1988

[30] Foreign Application Priority Data

Jan. 9, 1987 [IT] Italy .............................. 47510 /A87
Sep. 11, 1987 [IT] Italy .............................. 48376 /A87

[51] Int. Cl.⁴ ............................................. A47K 4/00
[52] U.S. Cl. ......................................... 4/663; 4/664; 52/65
[58] Field of Search ............... 4/664, 662, 663; 52/64, 52/65, 245

[56] References Cited

U.S. PATENT DOCUMENTS

| | | | |
|---|---|---|---|
| 2,611,134 | 9/1952 | Jarrett | 4/664 |
| 3,458,871 | 8/1969 | Rivetti | 4/664 |
| 3,887,947 | 6/1975 | Tosca | 4/664 |
| 4,718,131 | 1/1988 | Kitamura | 4/664 |

Primary Examiner—Robert W. Jenkins
Attorney, Agent, or Firm—Laurence R. Brown; Alfred J. Mangels

[57] ABSTRACT

According to the invention the suite consists of a rotating platform (1) divided into three sections, each of which accommodates a sanitary fitting, a bulkhead which is of suitable height and is divided into three panels, each of which separates one sanitary fitting from the others and may help to support some other elements necessary to the operation of the sanitary fitting and to the comfort of the user, a second platform also circular in shape but fixed and in the same plane as a first, constitutes the shower tray or the standing area according to the circumstances. The WC communicates directly with an upper tank (122) located immediately below the WC itself and connected, by means of corrugated hoses (128) or the like to a lower tank (122), which is removable and into which the contents of the upper tank are transferred once two on-off gate valves have been opened.

14 Claims, 22 Drawing Sheets

FIG. 18"

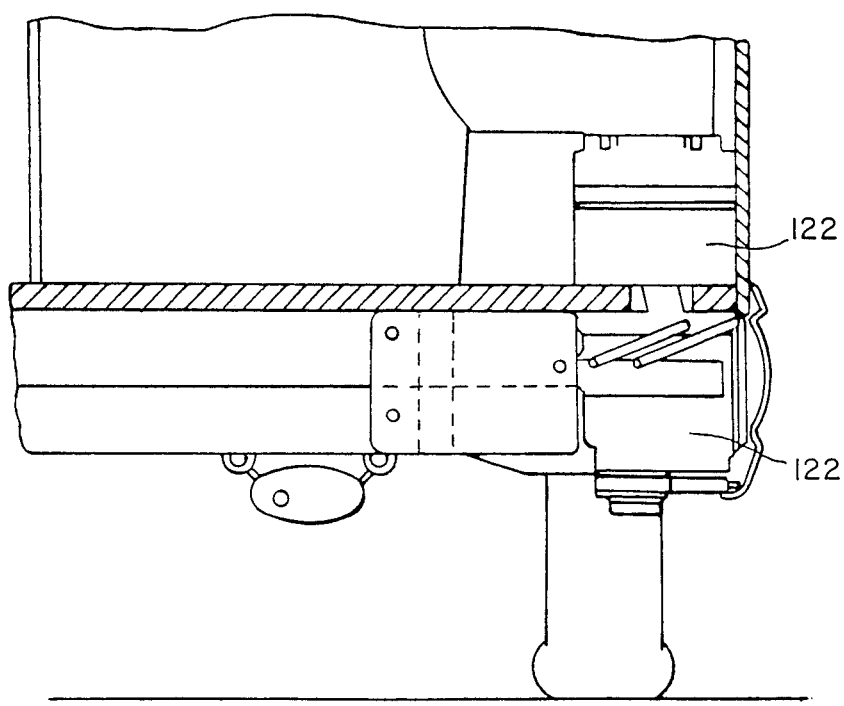
FIG. 18'a

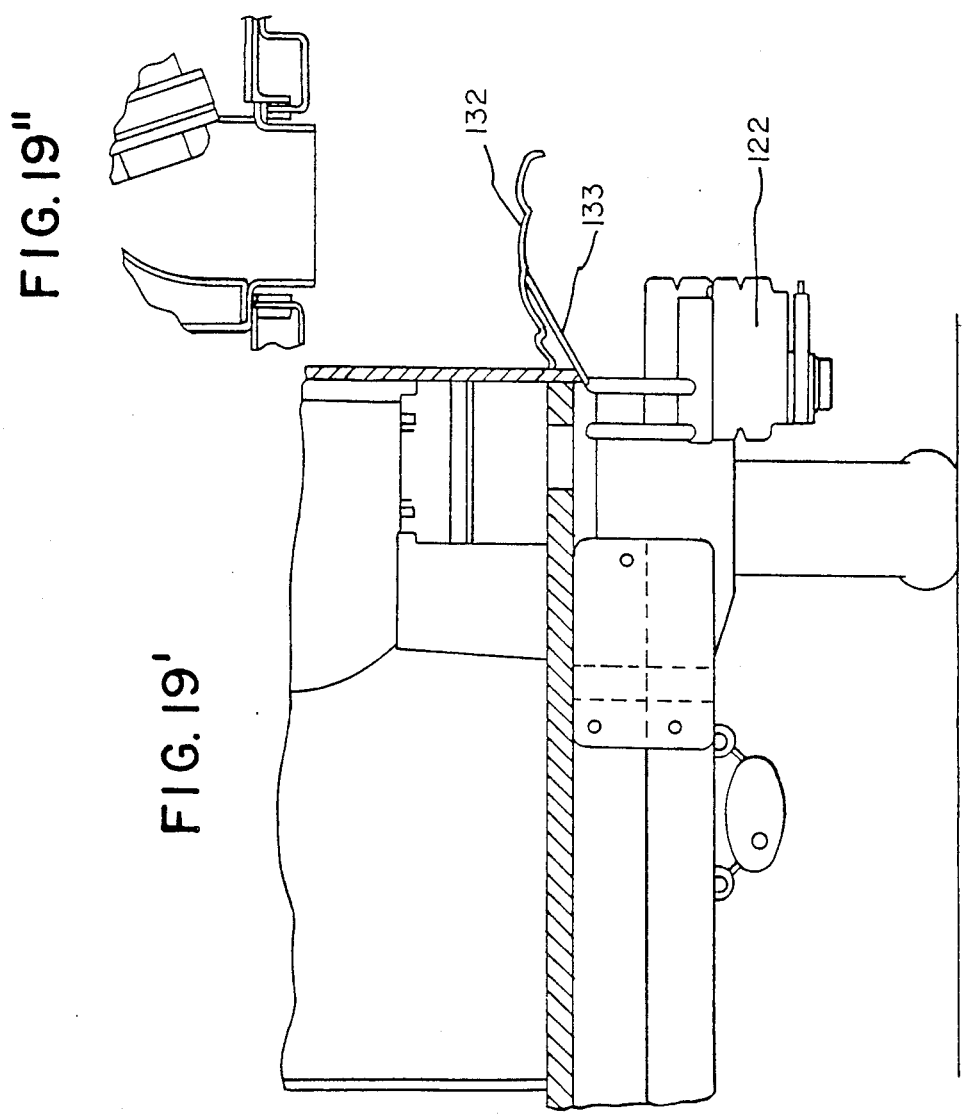

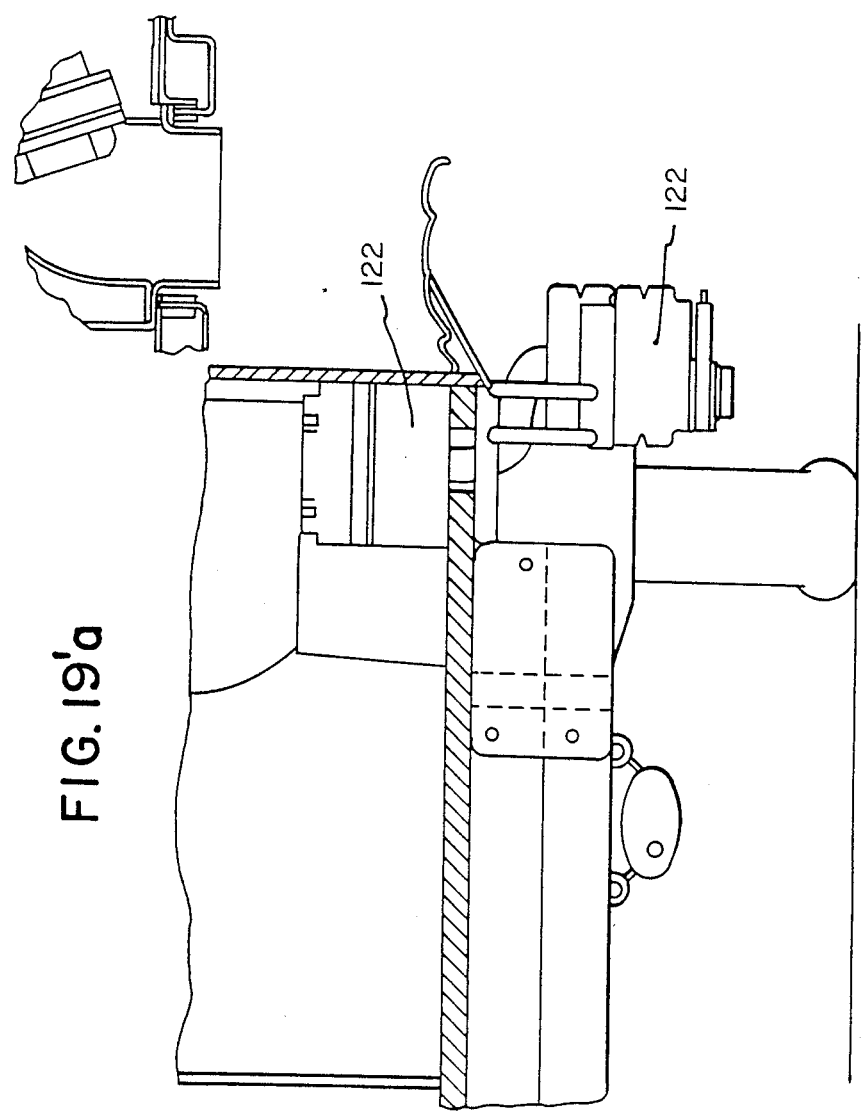

SANITARY FITTINGS AND TO COLLECTING TANKS, VALVES AND WCS, PARTICULARLY SUITABLE FOR USE IN CAMPERS, CARAVANS AND DOMESTIC DWELLINGS

BACKGROUND OF THE INVENTION

It is well known that the number of campers, caravans and similar vehicles produced annually has been increasing for a number of years. It is also known that constant research and experimentation has made these facilities increasingly more comfortable and pleasant to live in. The interior areas have, in fact, been designed so that they can be used for the various needs that may arise in the course of the day, converting a sofa into a bed, for example. From a close examination of current models of campers or caravans it is easy to appreciate that the only area that has not so far been used for more than one purpose, even though it has been greatly improved over the last few years, is the washroom area which occupies a not insignificant area inside a camper which cannot be used for other purposes.

SUMMARY OF THE INVENTION

One of the subjects of the invention is an improved suite of sanitary fittings in which, for example, the washbasin, the WC and the shower are separated from one another by vertical bulkheads and are located on a rotating platform which makes available to the user the sanitary fitting he requires to use from time to time.

The bulkheads which separate the various sanitary fittings are preferably curved, and if viewed from above they are star-shaped with three or more panels. The water supply pipes pass through at the point of intersection of the three bulkheads whilst the discharge point for the various fittings is in the center of the platform.

Part of the rotating platform on which the sanitary fittings are located intersects a second platform which can function either as a shower tray or, when suitably covered, as a standing area for the other sanitary fittings when they are being used.

Sliding doors that are shaped in such a way that they can easily travel round the outer periphery of the platform are fitted on the outer edge of the second platform. If one of the sanitary fittings located on the rotating platform is in use these doors may be closed in order to provide the usual degree of privacy whereas when none of the sanitary fittings is in use they may be slid back and located against the bulkhead which supports the shower, thereby preventing any obstruction and leaving the shower tray area completely free as a passageway or for some other use.

As mentioned, the sanitary fittings are integral with a rotating platform which is centrally pivoted and the underside of which has nylon balls, small rotating wheels or the like, which ensure that it rotates perfectly with respect to the bearing surface of the camper or caravan and the balance with any of the sanitary fittings may be utilised.

In order that the platform and the sanitary fittings that are integral with it may rotate freely, at the points where the water supply and discharge pipes connect with the pipes coming from the roof of the camper and caravan and with the waste water collecting tank, they are equipped with elements which allow them to rotate by means of balls, or the like, and seals which prevent any loss.

In a preferred solution the rotating platform has a washbasin, a WC and a shower, vertically divided off by the bulkhead mentioned, whilst the standing platform has sliding doors round its periphery which, in the transit position, are located against the bulkhead which divides the shower from the other sanitary fittings.

A further option offered by the suite of sanitary fittings according to the invention is that it is possible to use more than one sanitary fitting at a time, particularly when the rotating platform is in some of its positions; it is possible, for example, to use the WC from one side of the platform and the washbasin from the other side provided, of course, that the complete suite is positioned in such a way as to allow access from both the inside and the outside.

A further subject of the invention, with the aim of further improving the use of all the sanitary fittings, is improvements to both the discharge valves and the removable lower tank into which the contents of the upper tank are transferred when it requires emptying.

As already mentioned above, the WC in a camper or caravan communicates directly with a tank located immediately below the WC itself; this first upper tank is connected, in some cases by means of connectors, corrugated hoses or similar equipment with quick-action couplings, to a lower tank into which the contents of the upper tank are transferred once two on-off gate valves have been opened.

The gate valve according to the invention consists of a housing made in a single piece which is fitted to the bottom of the upper and lower tanks in the usual way and a diaphragm or shutter consisting of a flat disk connected to the handle by means of a rod. The end of the rod opposite the shutter and to which the handle is connected is threaded so that if the handle breaks the broken handle can be removed quickly and replaced with a new one just as quickly and at little expense.

The housing of the gate valve according to the invention has been equipped with four external slot-shaped holes which both provide interchangeability with other valves and enable the valve in question to be fitted with ease to the majority of the tanks and WCs available on the market. This one-piece external housing is not only more practical and economical (with respect to those currently on the market, which are in two halves connected by small bolts and seals) but, whilst having the same thickness, also provides greater resistance to deformation when being tightened onto the tank, thus ensuring both perfect operation and an equally perfect seal.

In addition both the shutter and the rod are guaranteed leak-tight by means of suitable seals which provide protection from potential losses and, in order to prevent any undesired opening of the gate valve, that part of the rod that is close to the diaphragm has a limit mark which may only be passed by exerting sufficient force on the handle.

As already mentioned above the WC discharges into a first tank generally located immediately below the WC itself which is connected by means of a suitable connector to a gate valve which cuts off the flow to a second tank which is the same size as or larger than the first, fitted with a second gate valve, and suitable for receiving the contents of the upper tank when it requires emptying.

The lower tank is usually located in a compartment in the side of the body or the rear section of the camper depending on the position of the WC and is accessible from the outside, preferably after the contents of the upper tank have been discharged into the lower one. Removal of the lower tank is not very easy and is complicated by the fact that in order to remove it, it is obviously necessary to remove the pipes that connect it with the upper tank. The improvements that are the subject of the invention have devised a support consisting of a section of rectangular design which is joined to the underside of the floor or the associated top section by means of screws or the like. Four connecting rods, two per side, are pivot-mounted onto this section at the top and onto a second section which is of open rectangular design, at the bottom.

The two arms of the bottom section are shaped so that they can be inserted into suitable grooves along the sides of the tank.

In the position of use the tank is retained on the support by the section which is, as stated, inserted along the sides of the tank and by a suitable spring catch which is easy to operate; the connecting rods that articulate the support are bent upwards and towards the inside of the compartment provided to house the tank and the connectors to the upper tank are inserted.

In the removal position, after opening the external door which gives access to the compartment and keeping it open by means of the collar which surrounds the tank as an additional safety device, the lower tank, now without the collar which surrounds it and released from the suitable spring catch which kept it closed, is removed from the compartment by pulling on the appropriate handle fitted to the tank. With this force pulling towards the outside the connecting rods, which were, as stated, bent upwards and towards the inside of the compartment, adopt a vertical position, causing the tank to drop down and bearing it away from the housing compartment. In this position it is clear that the disconnection of the pipes that connect with the upper tank and the disconnection of the tank itself from the retaining support are greatly facilitated as is the replacement of the tank on the support.

DESCRIPTION OF THE DRAWINGS

The brief description given so far may be better understood from the detailed description which follows, with reference to the attached drawings in which:

FIGS. 17a, 18a, 18'a, 19a, 19'a, 19"a, 20a show the same sectional, plan and axonometric views shown in FIGS. 17 to 20, for the alternative in which the central connection is made with a flexible connector fitted with quick-action couplings and gate valves.

DESCRIPTION OF THE PREFERRED EMBODIMENTS

Figure 1:
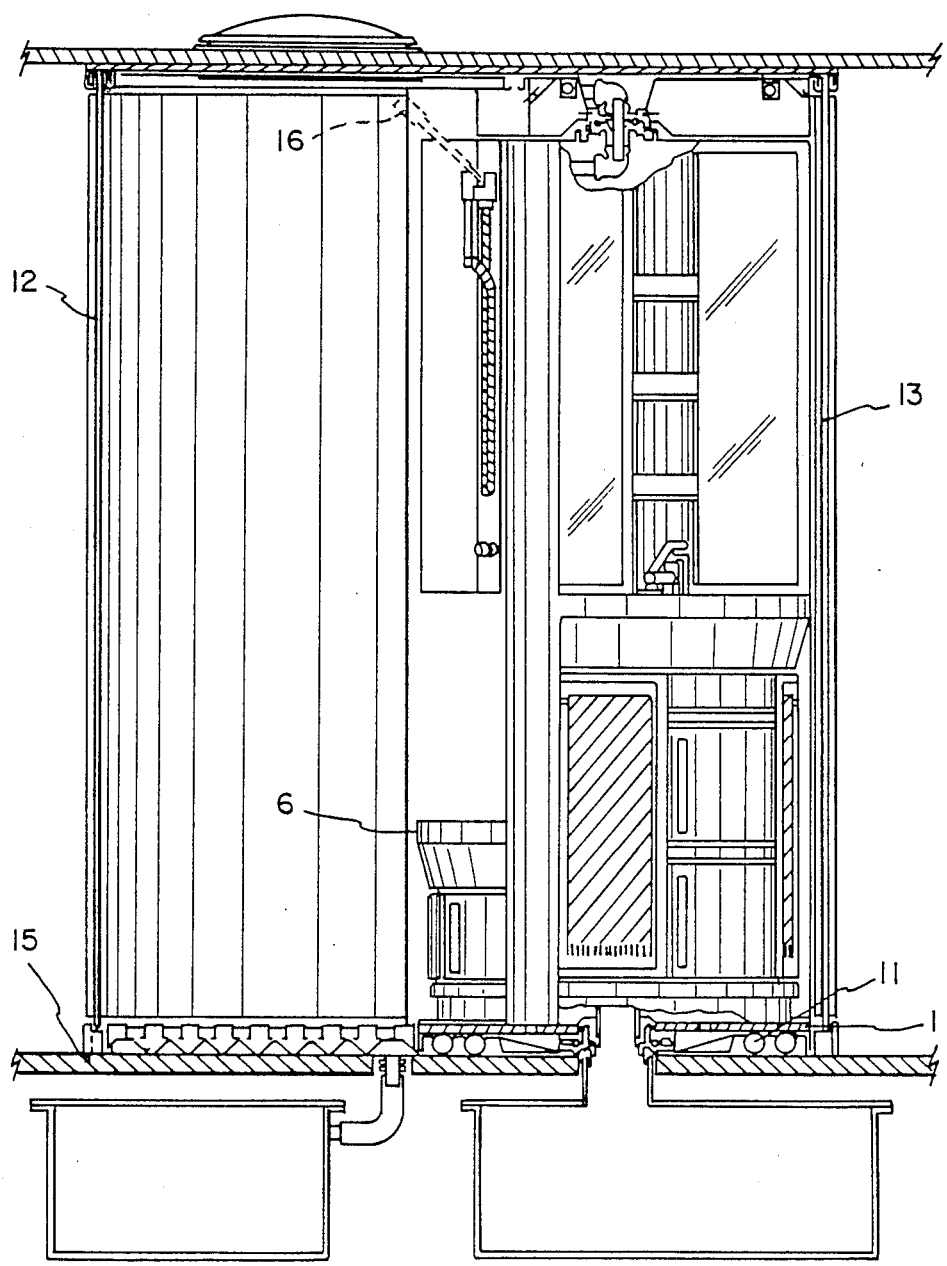
FIG. 1 shows a longitudinal section of the suite in the WC position.
Figure 2:
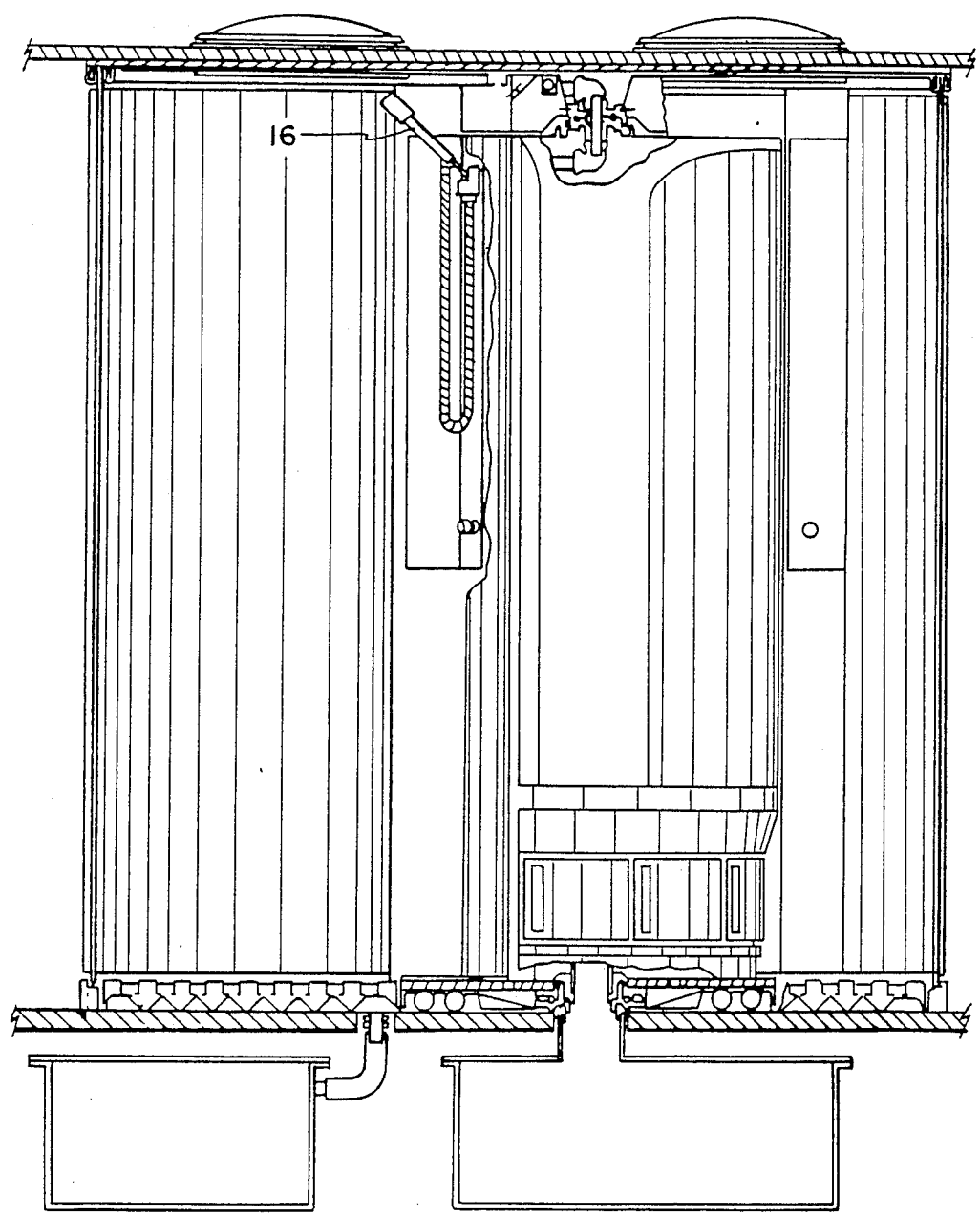
FIG. 2 shows a longitudinal section of the suite in the shower position.

With reference to the said drawings and FIGS. 1 to 16 in particular, the suite of sanitary fittings according to the invention consists of a rotating platform 1, divided into three sections, a bulkhead 2 which is of suitable height and is divided into three panels 3, 4 and 5, each of which separates one sanitary fitting from the others and may help to support some other elements necessary to the operation of the sanitary fitting and to the comfort of the user.

In the case shown in the illustrations the fittings comprise a WC 6, a washbasin 7 and a shower 8.

As already mentioned above, these sanitary fittings are mounted on a platform 1 of circular design, centrally pivoted and rotating in such a way that the user may bring the particular sanitary fitting that he needs at the time round to the standing platform 9 that is in front of him and hence in a position ready for use. Like the platform in front of him 1, platform 9 is also of circular design but a small section 10 has been removed so that the rotating platform 1 may rotate freely when in the same plane.

Figure 3:
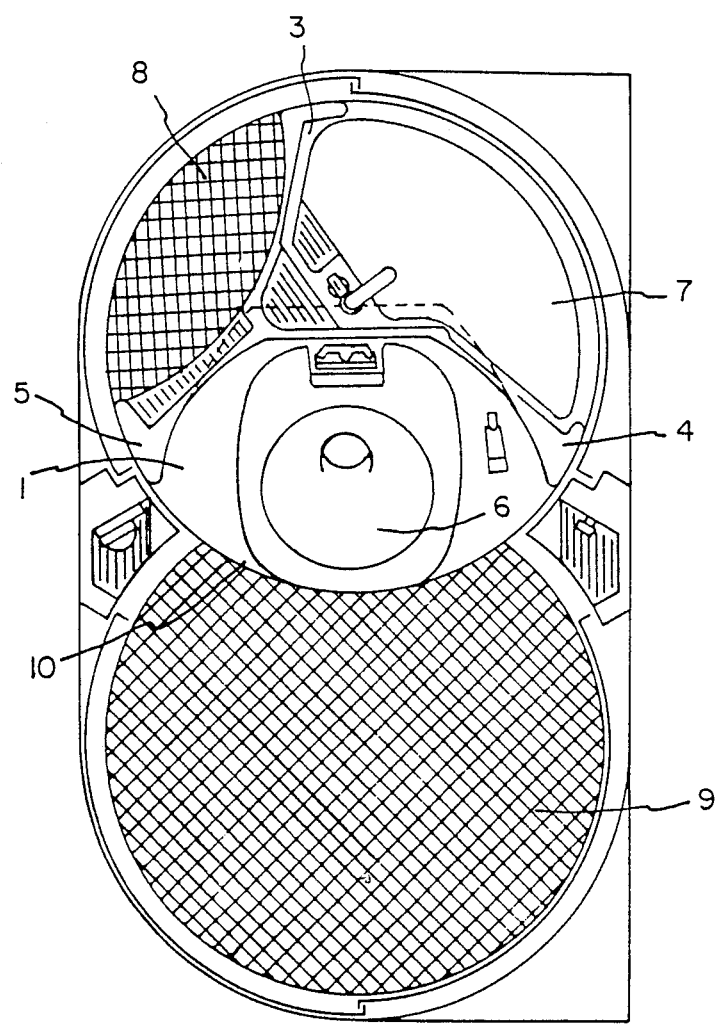
FIG. 3 shows a plan view of the suite in the WC position.
Figure 4:
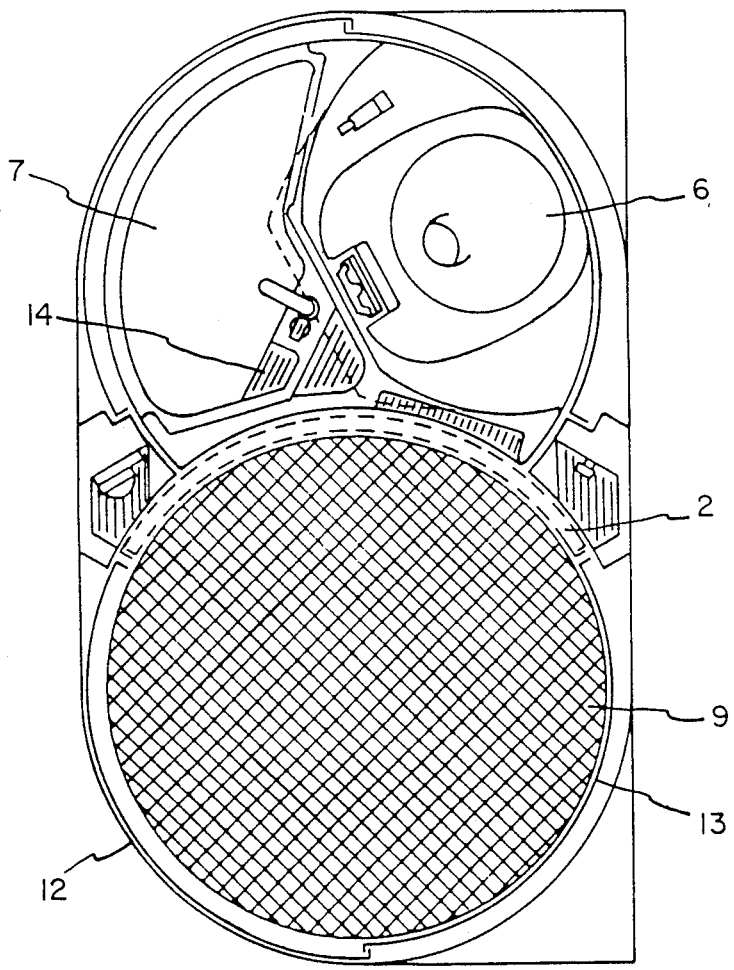
FIG. 4 shows a plan view of the suite in the shower position.
Figure 5:
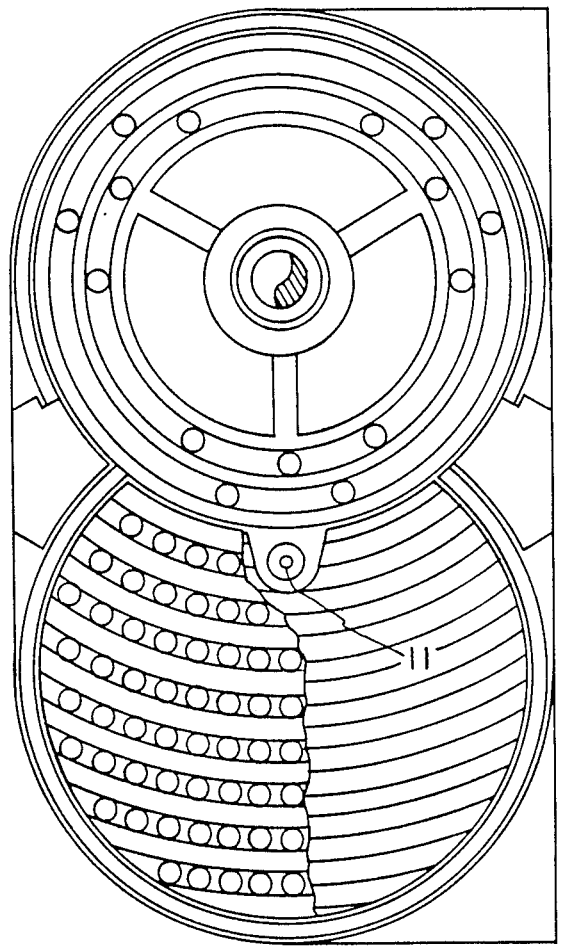
FIG. 5 shows a sectional view of the lower base of the platform.

As can be seen from the sectional drawings shown in FIGS. 1, 3 and 5, the bottom of the platform has nylon wheels 11, or small rotating wheels or the like, which slide between suitable grooves thus allowing optimum rotation and preventing any potential imbalances in rotating platform 1, particularly when any of the sanitary fittings, such as WC 6 for example, is in use.

Clearly, as platform 1 on which the sanitary fittings are installed rotates, it is necessary for the point at which both the pipes that supply water to the sanitary fittings and the discharge pipes connect with the associated fixed pipes to have elements which allow them to rotate and at the same time prevent any potential loss.

In order, therefore, to allow the central section of pipe to rotate with respect to the end sections, junction sections have been designed which use suitable balls, similar to those used for bearings, sliding between suitable housings.

Figure 9:
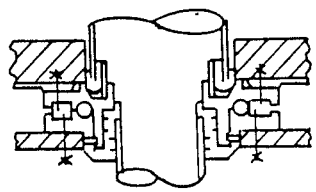
FIGS. 8 and 9 show the upper and lower sealed rotary joints on the water supply and discharge pipes.
Figure 8:
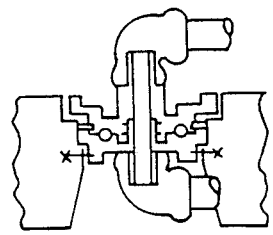
Figure 6:
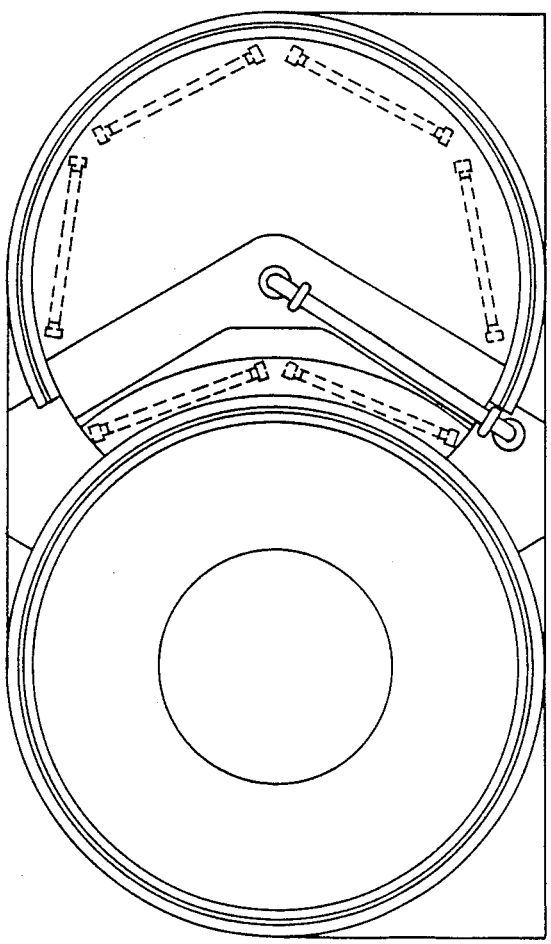
FIG. 6 shows a sectional view of the upper part of the suite.
Figure 7:
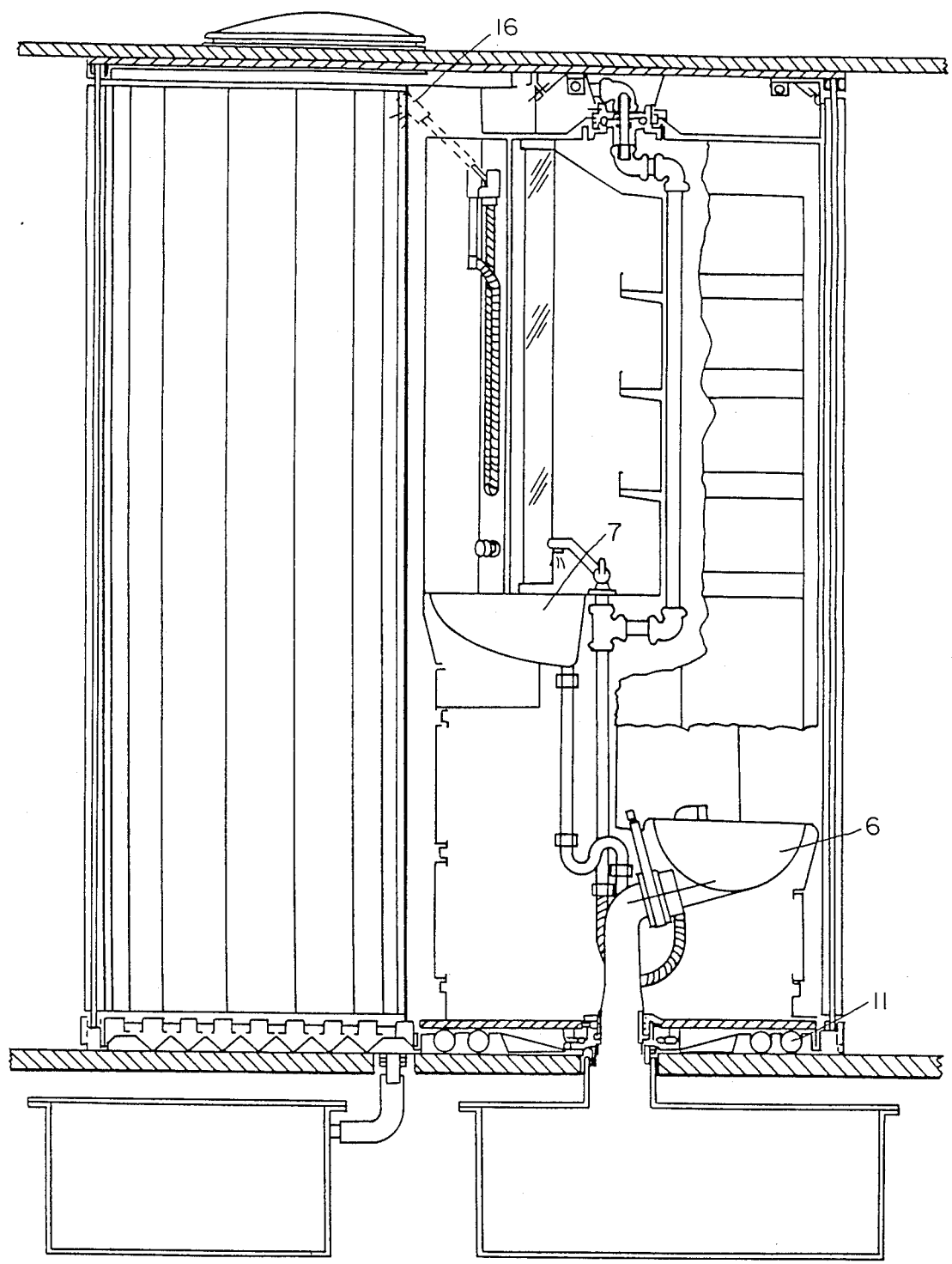
FIG. 7 shows a longitudinal central sectional view of the suite.
Figure 7B:
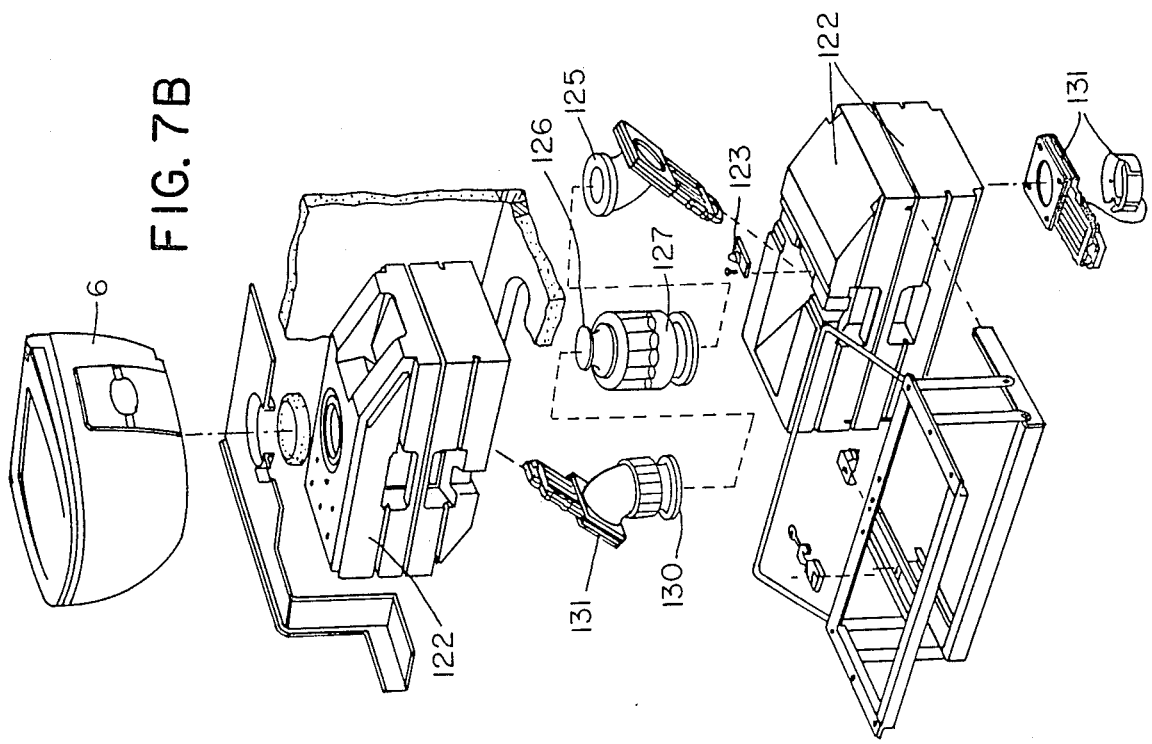
FIG. 7B shows an exploded view of the collecting system complete with quick-action couplings and accessories for locking and connection purposes.
Figure 7A:
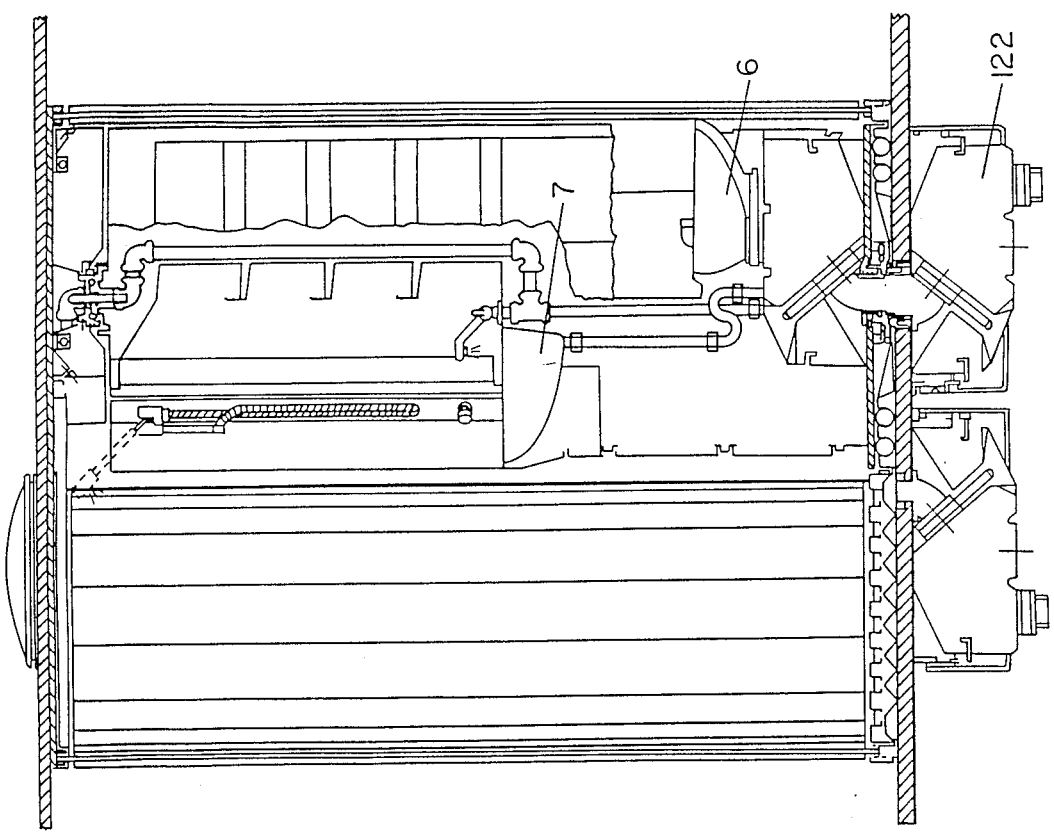
FIG. 7A shows a longitudinal central sectional view of the suite with the fixed collecting tank and an external pair of removable tanks for shower, WC and washbasin underneath.
Figure 7C:
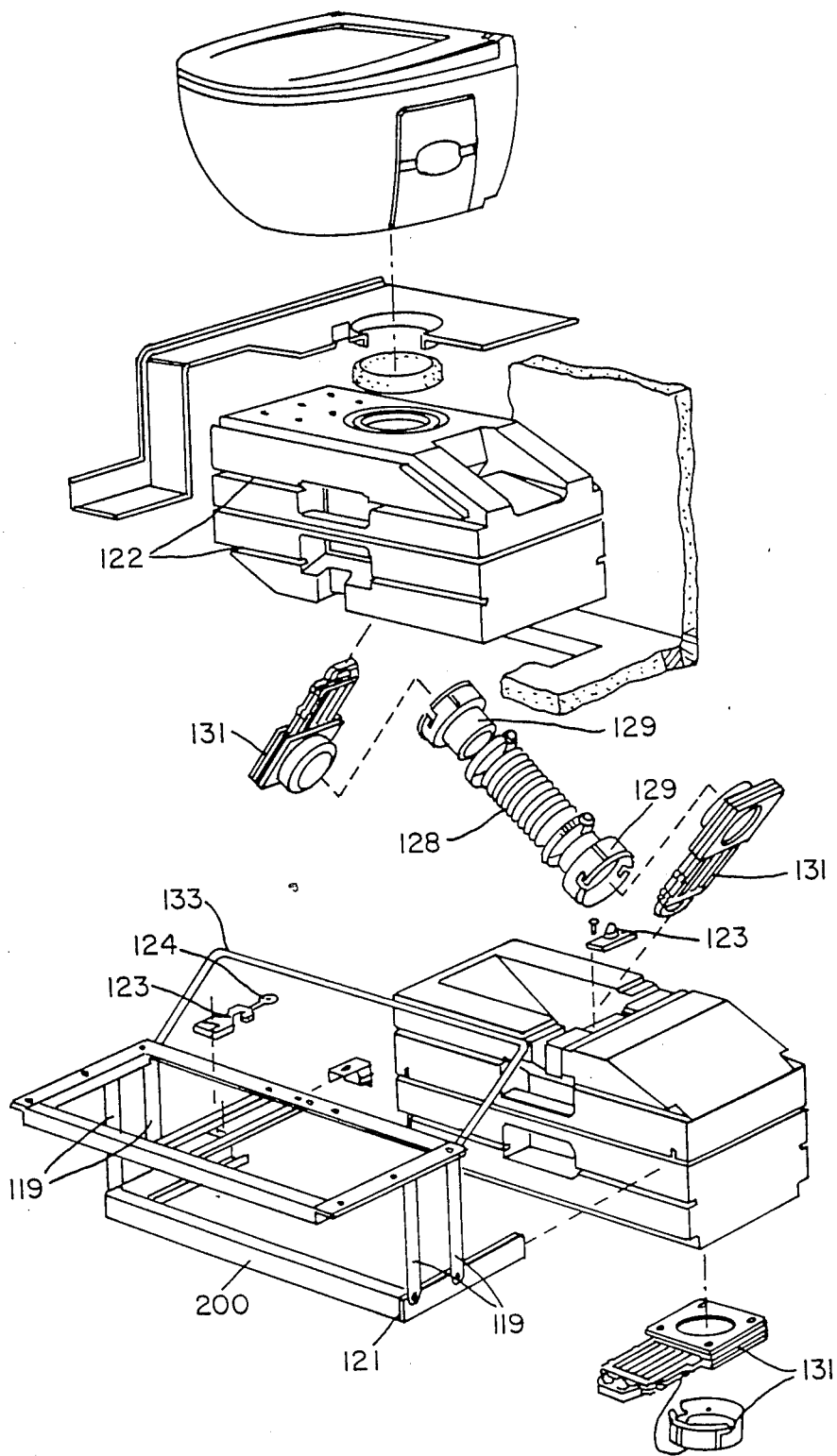
FIG. 7C shows an exploded view of the collecting system complete with quick-action locking devices and accessories and a flexible connection hose.
Figure 10:
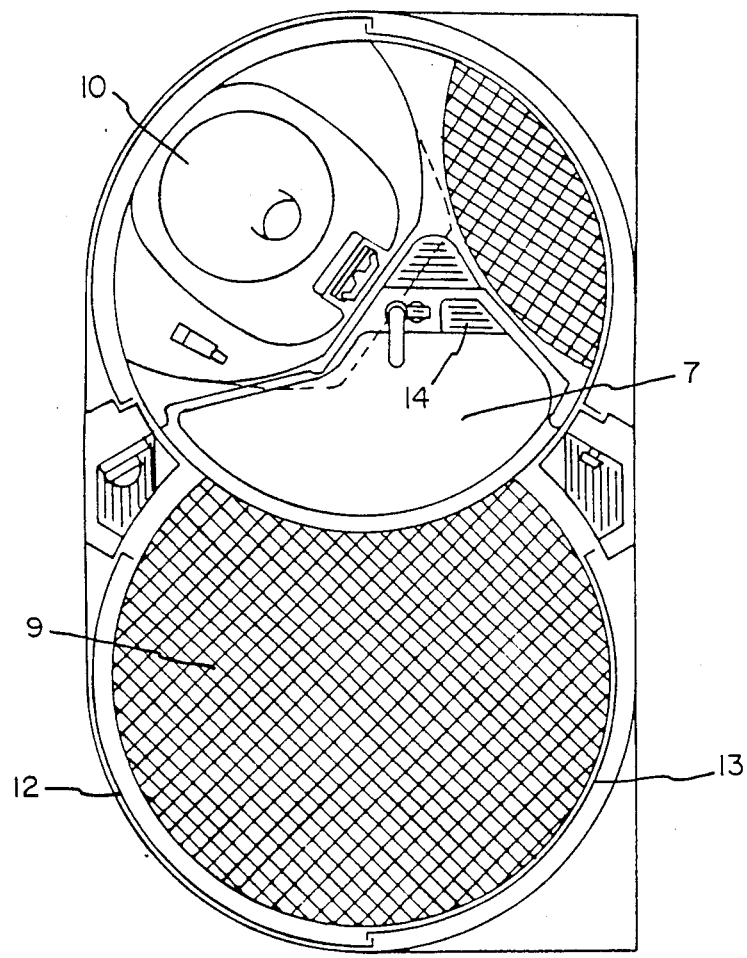
FIG. 10 is a plan view of the suite in the washbasin position.
Figure 11:
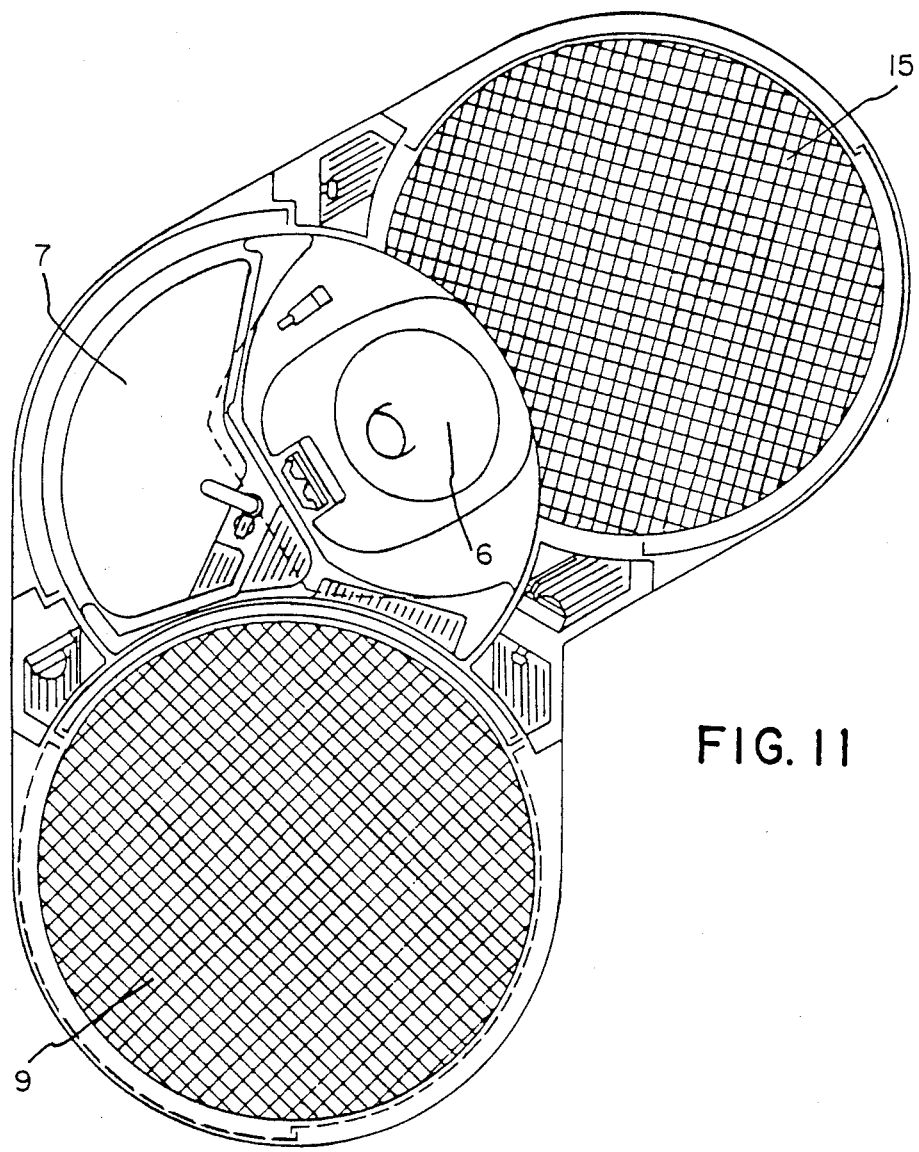
FIGS. 11 and 12 are plan and sectional views of a possible alternative which provides for a second platform.
Figure 12:
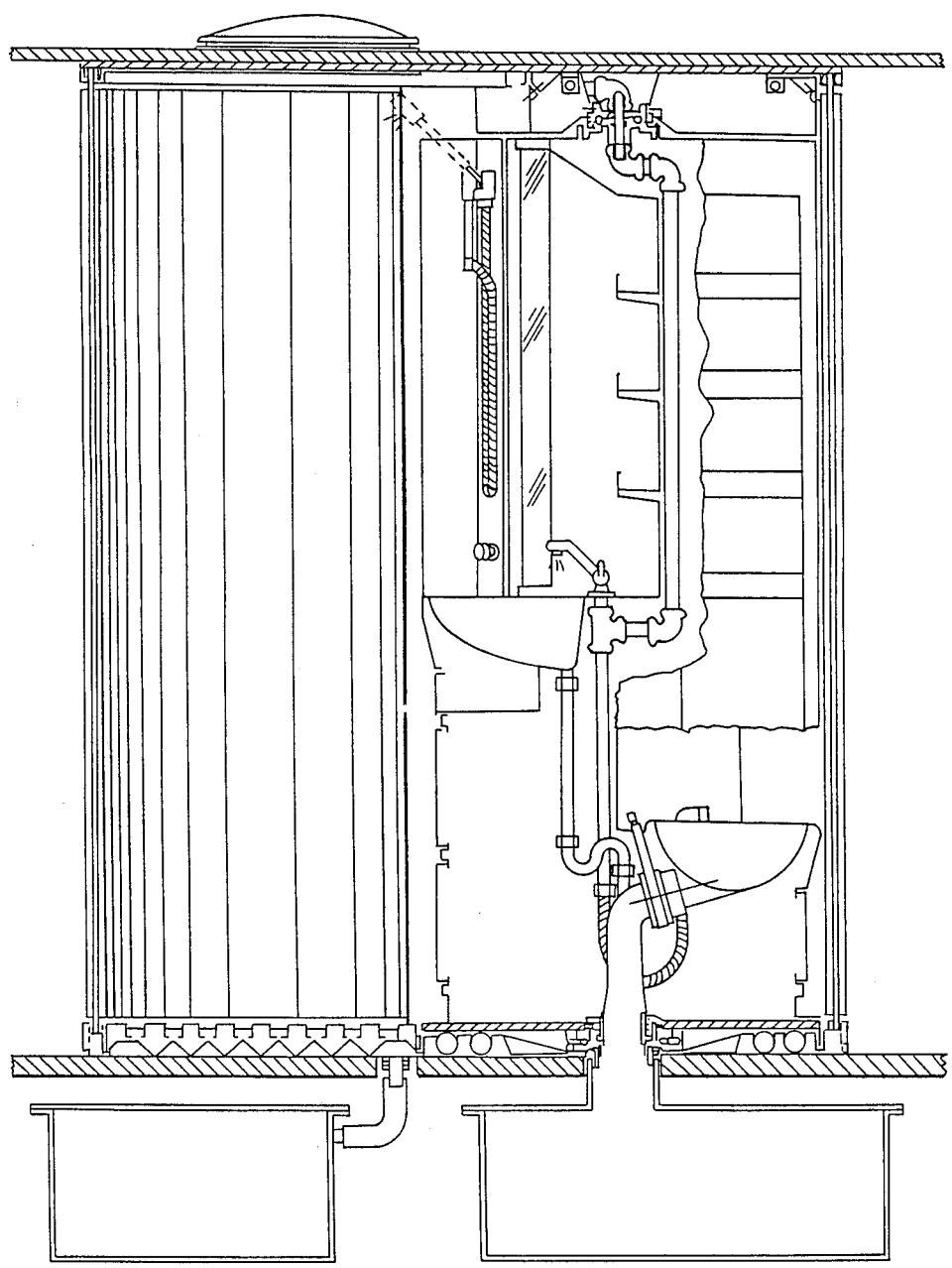
Figure 13:
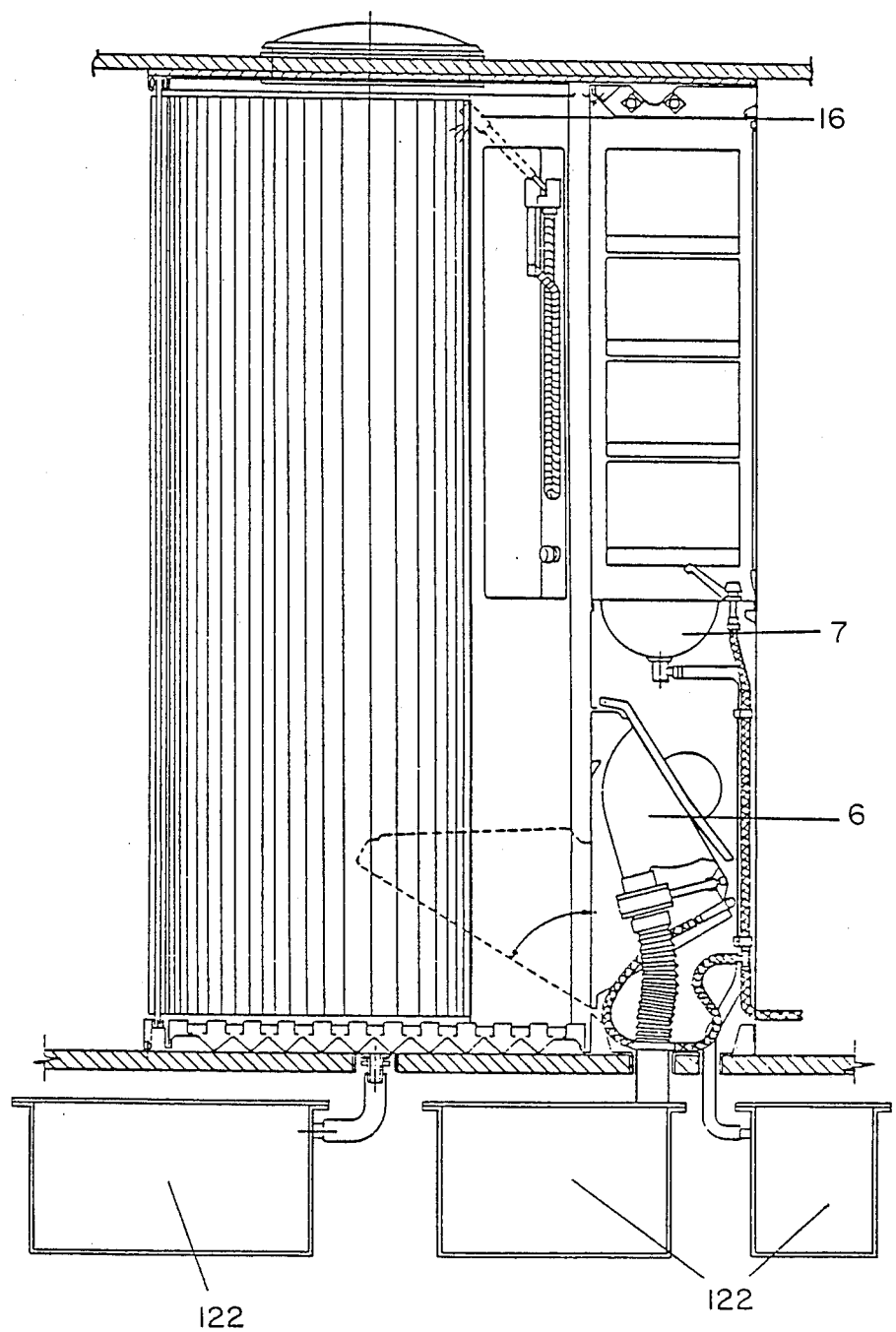
FIGS. 13, 14, 15 and 16 are sectional and plan views of two further alternatives using "gesnet" suites of sanitary fittings which are covered by other patents held by the same holder.
Figure 15A:
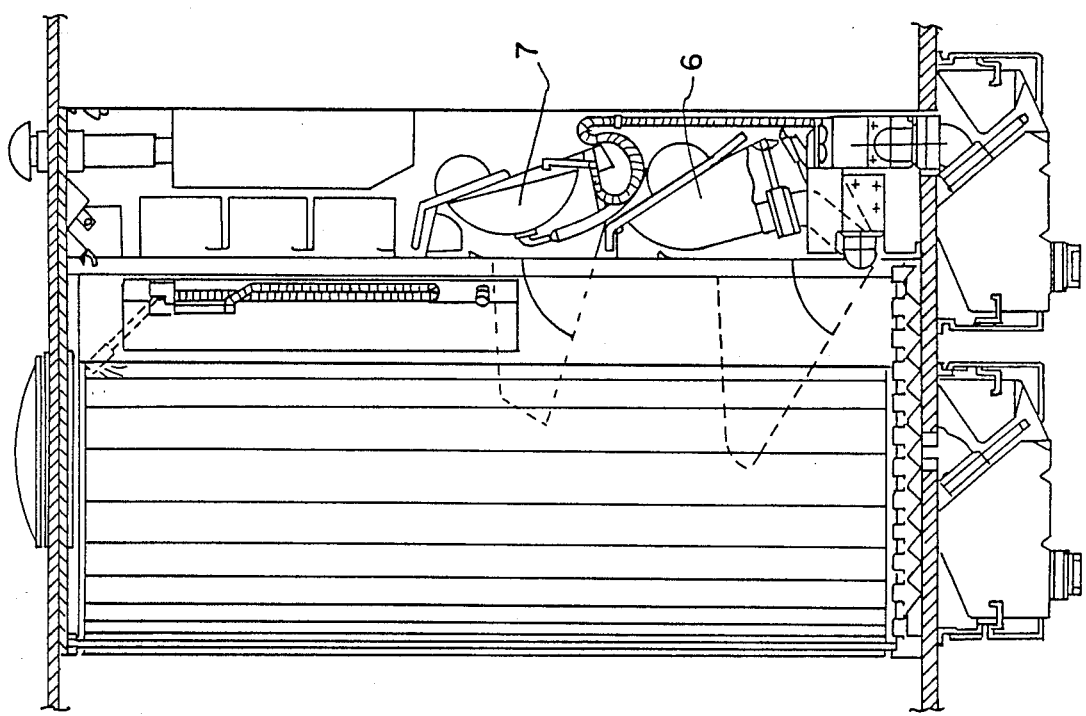
FIGS. 13A, 15A and 15B are sectional and axonometric views of two further alternatives using "gesnet" suites of sanitary fittings.
Figure 13A:
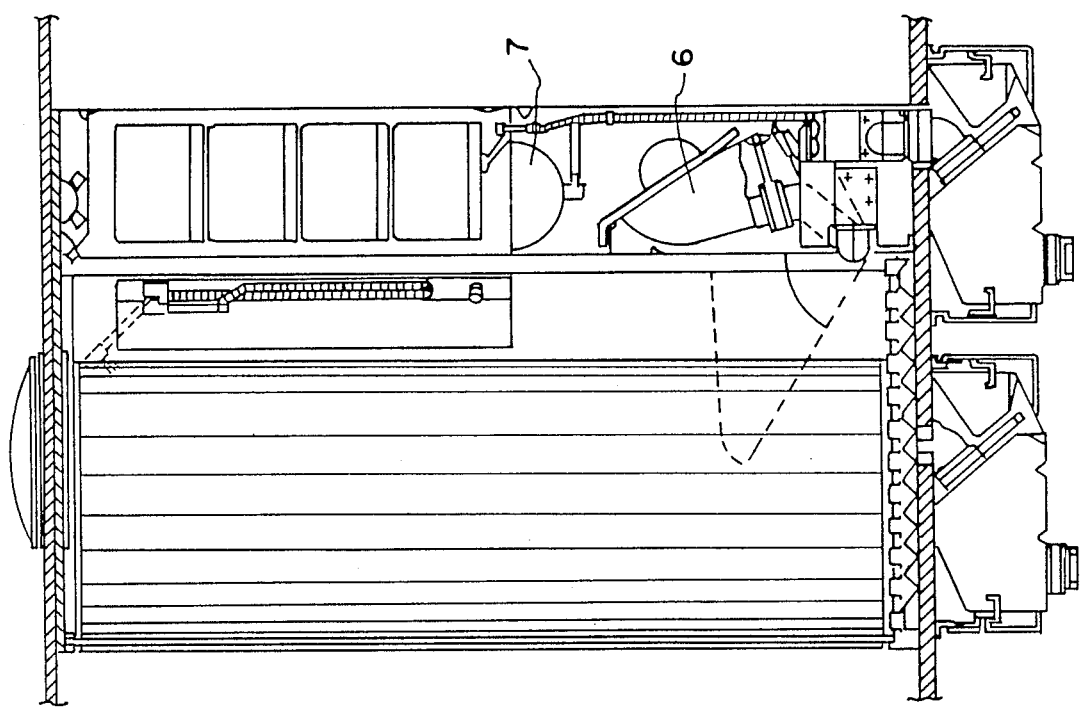
Figure 14:
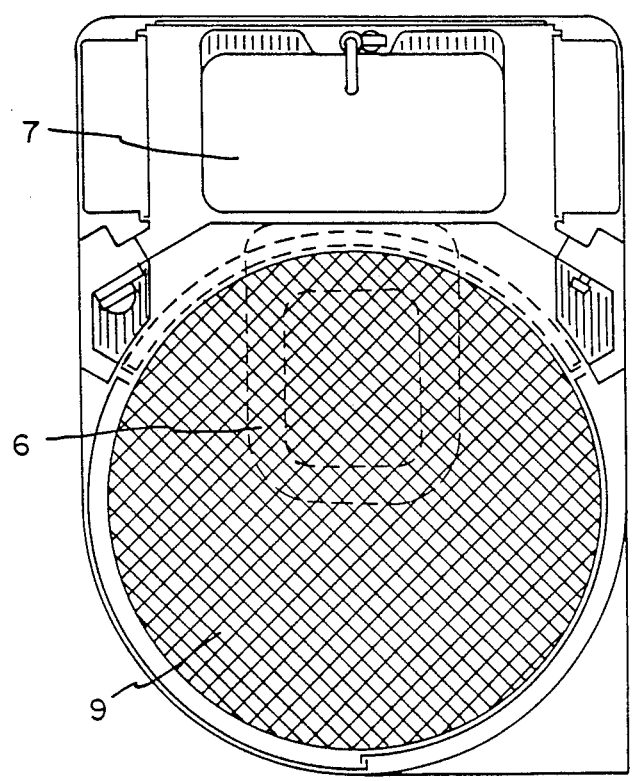
Figure 15:
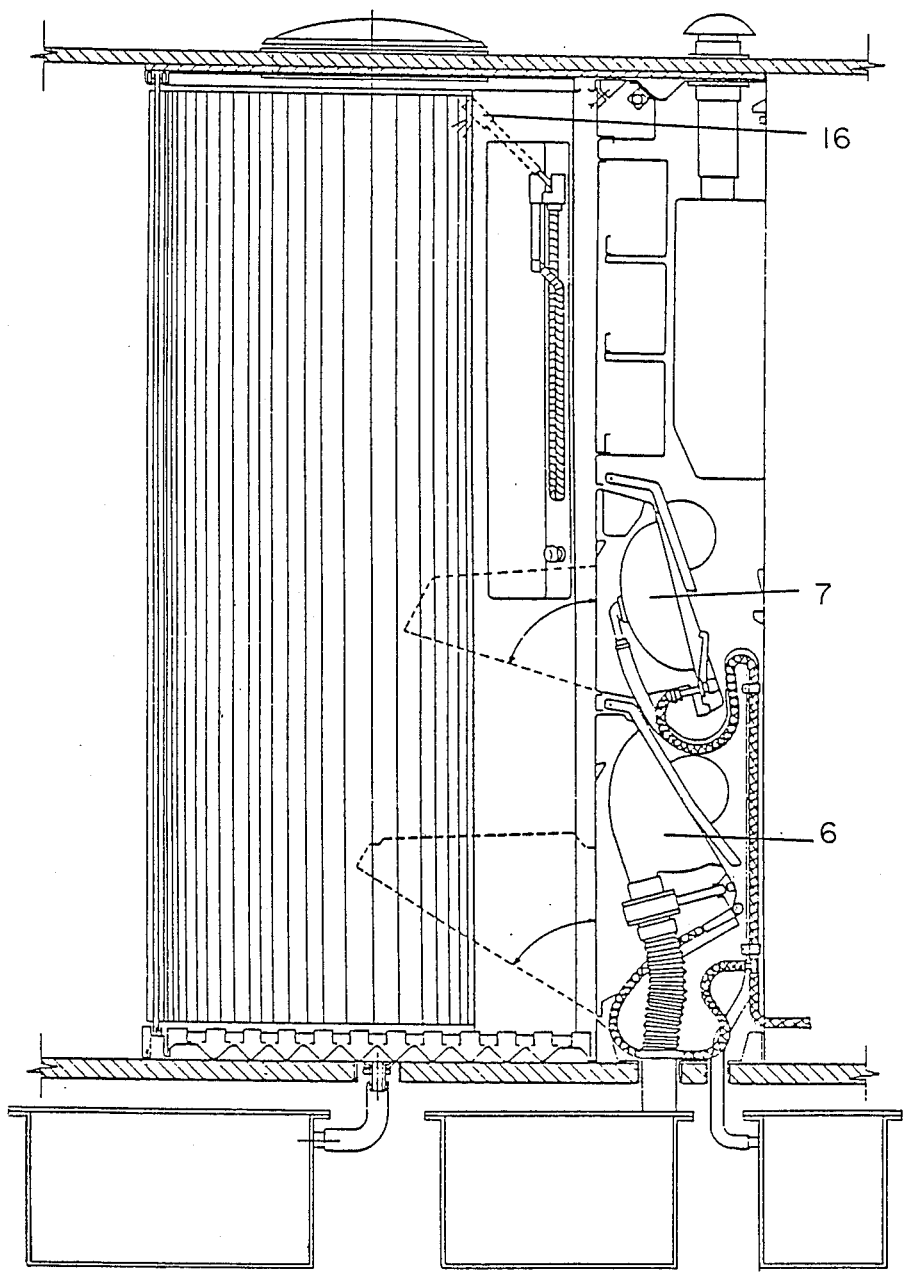
Figure 15B:
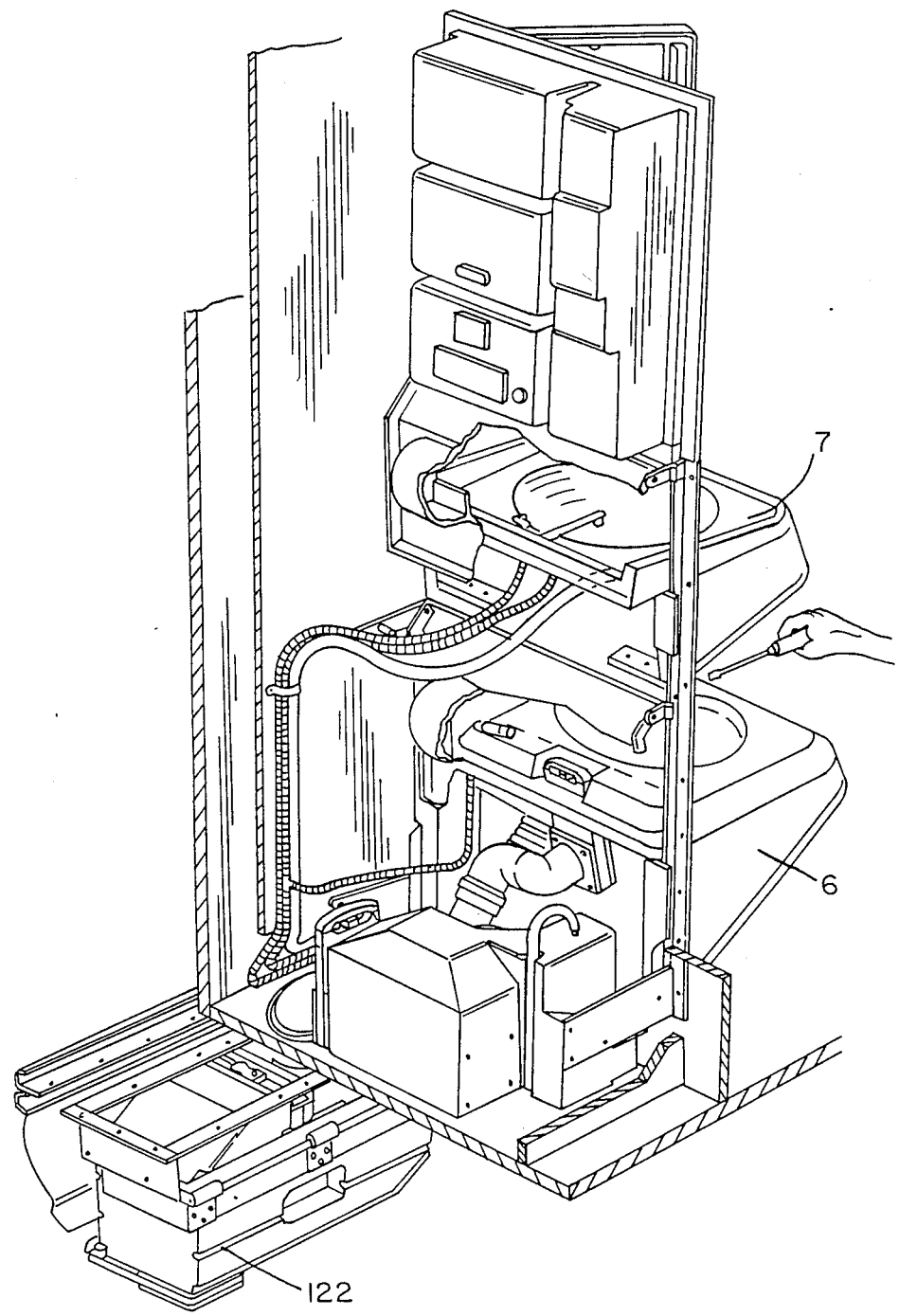
Figure 16:
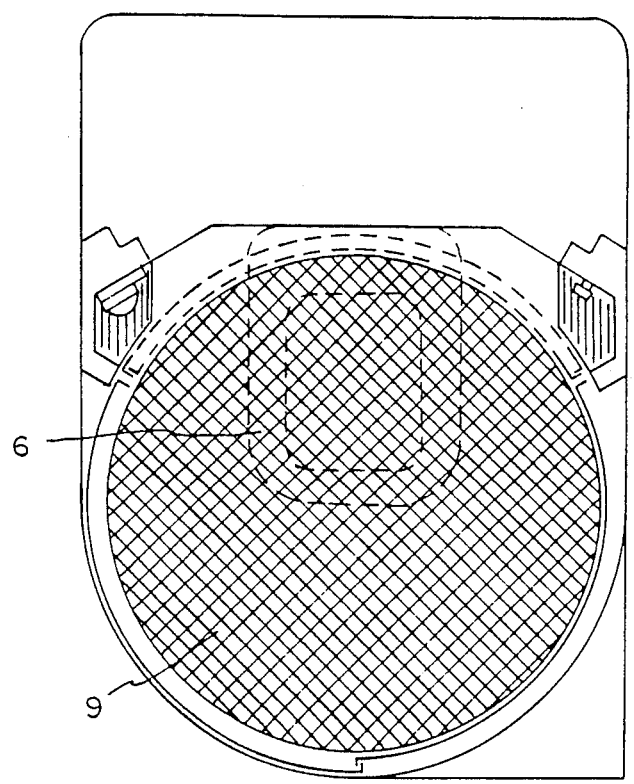
Figure 17:
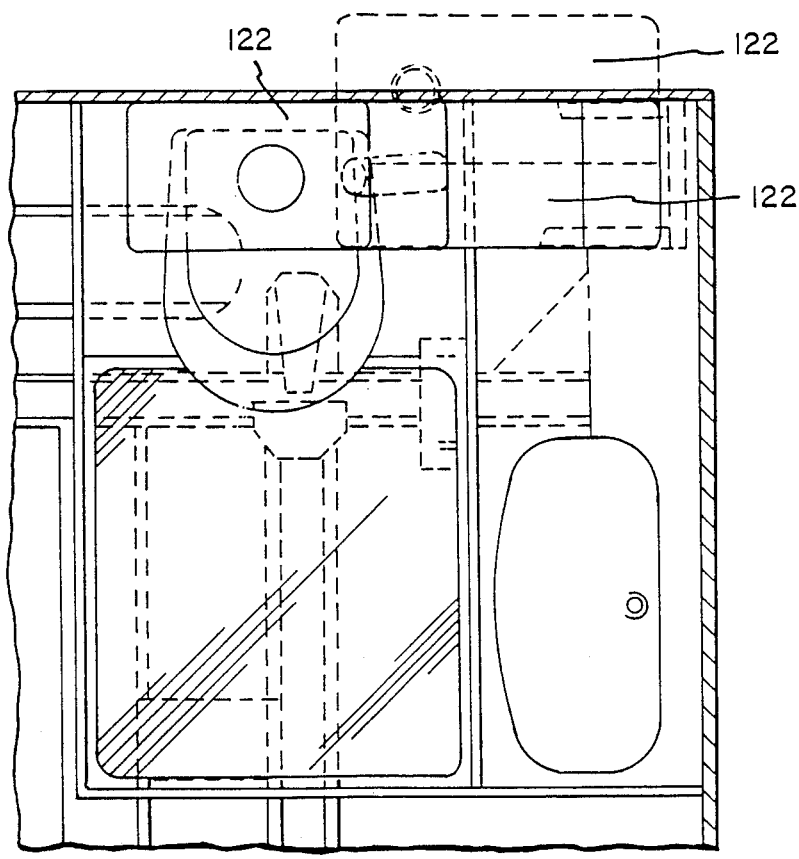
FIGS. 17, 18, 18', 18", 19, 19', 19", 20 show plan and sectional views of the housing compartment for the upper and lower tank in the various positions of use, in place, with the lower tank dropped down and with the tank removed in the version in which the central connection (FIG. 18") is made with rigid, threaded quick-action couplings that can be adjusted for height according to the various floor thicknesses.
Figure 17A:
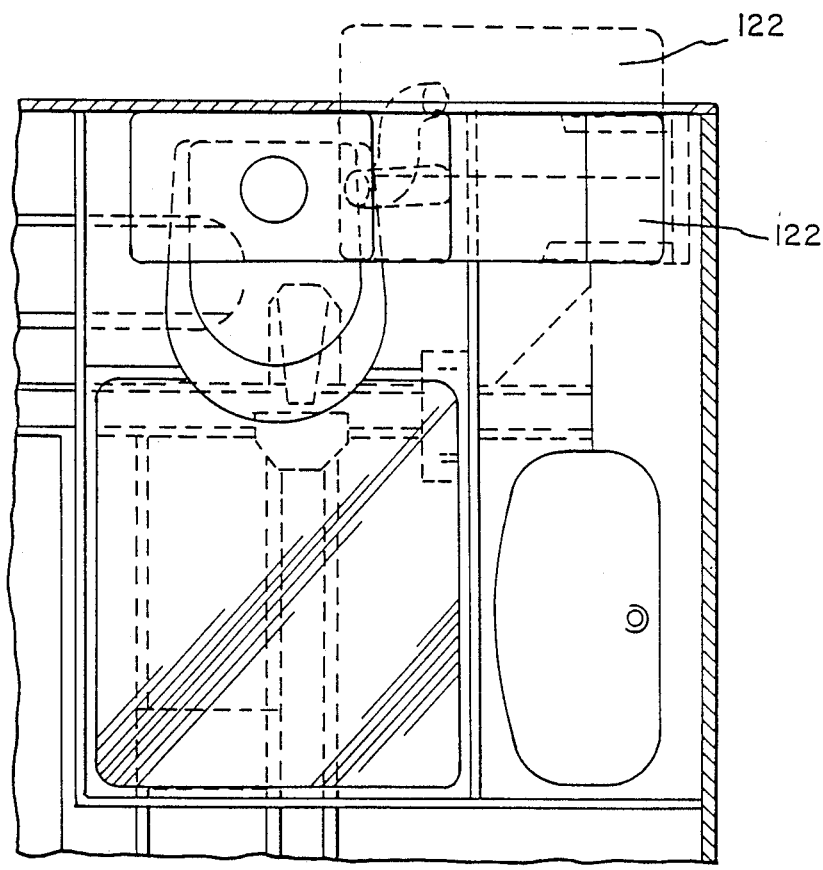
Figure 18:
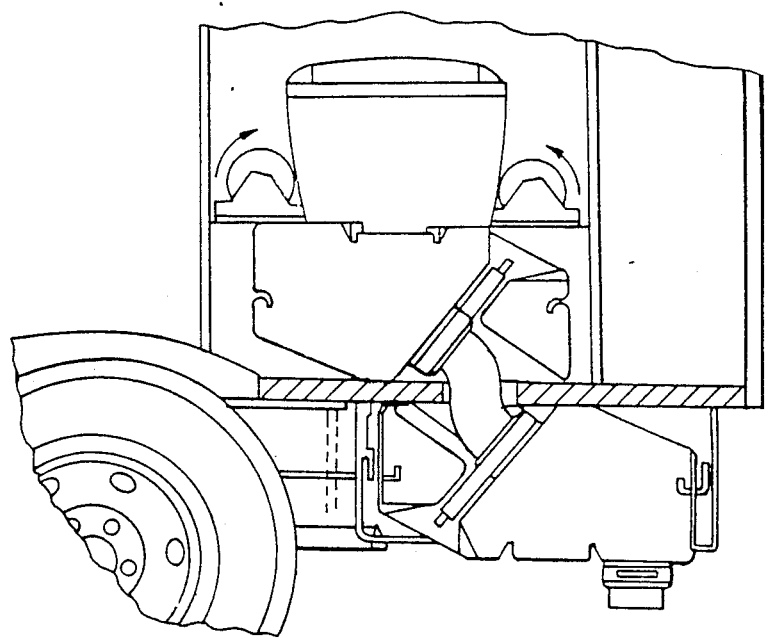
Figure 18:
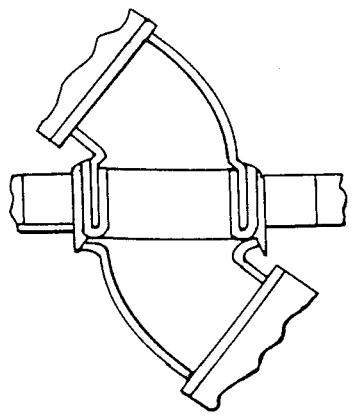
Figure 18A:
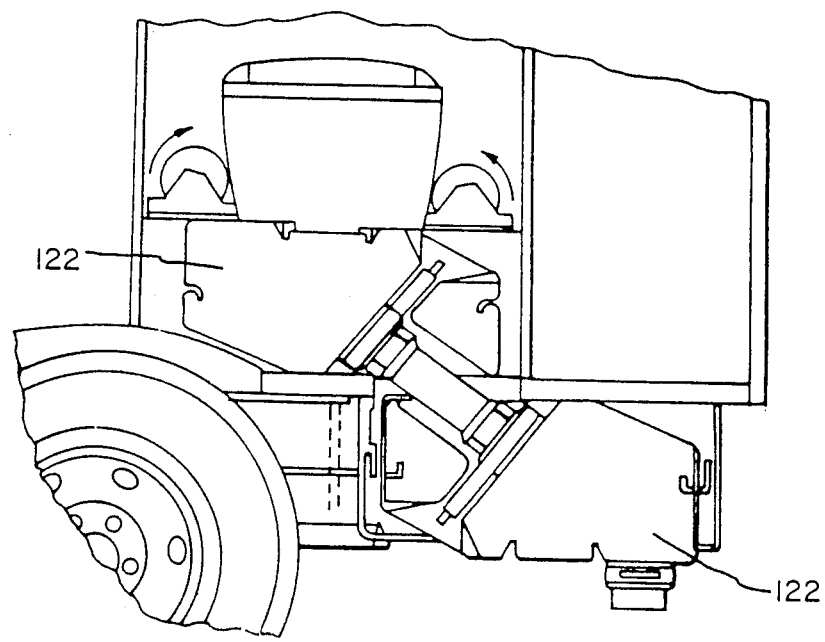
Figure 18:
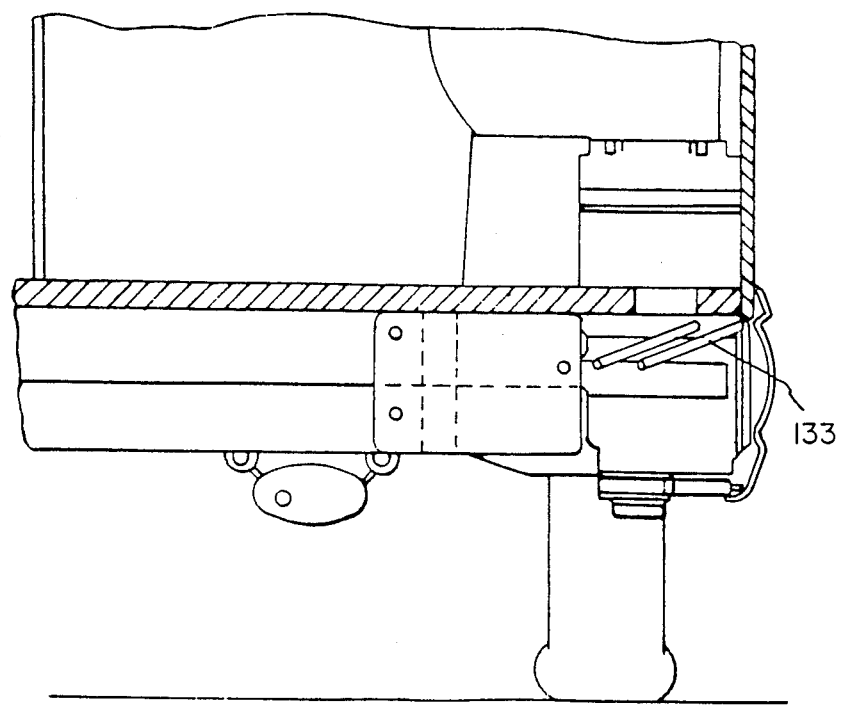
Figure 19:
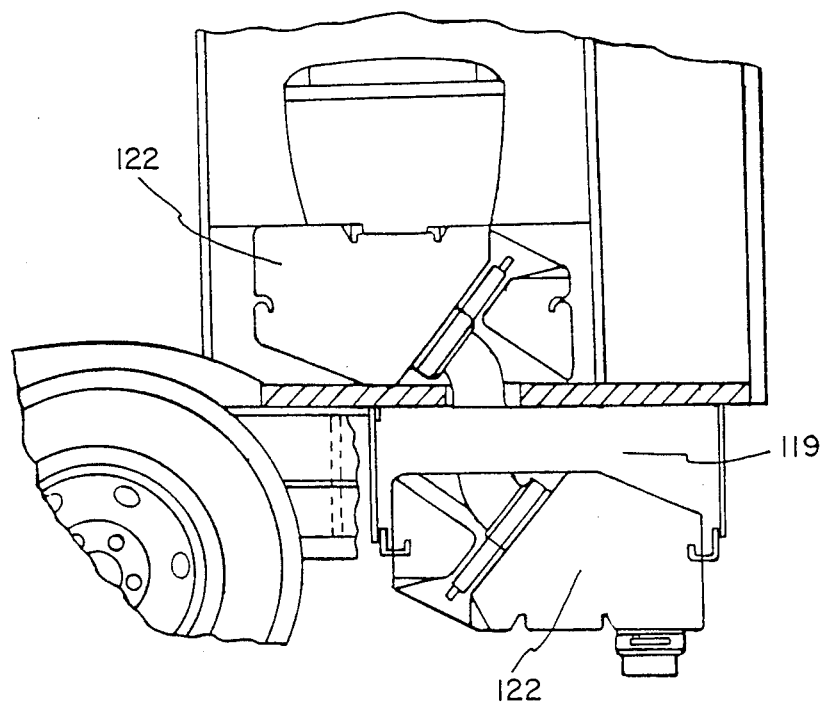
FIGS. 19" and 19"a show the connection between the WC and the first fixed tank, with detail drawings of the seals.
Figure 19A:
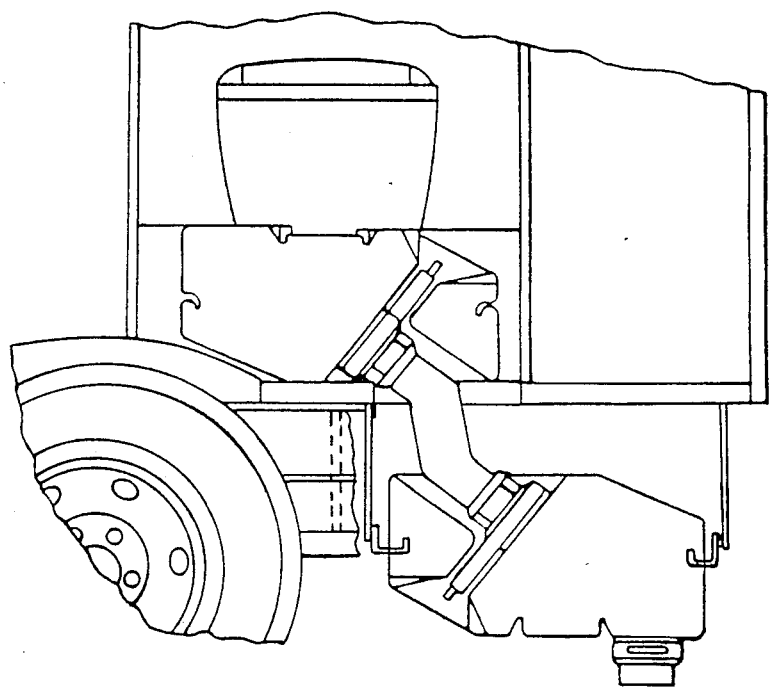
Figure 20:
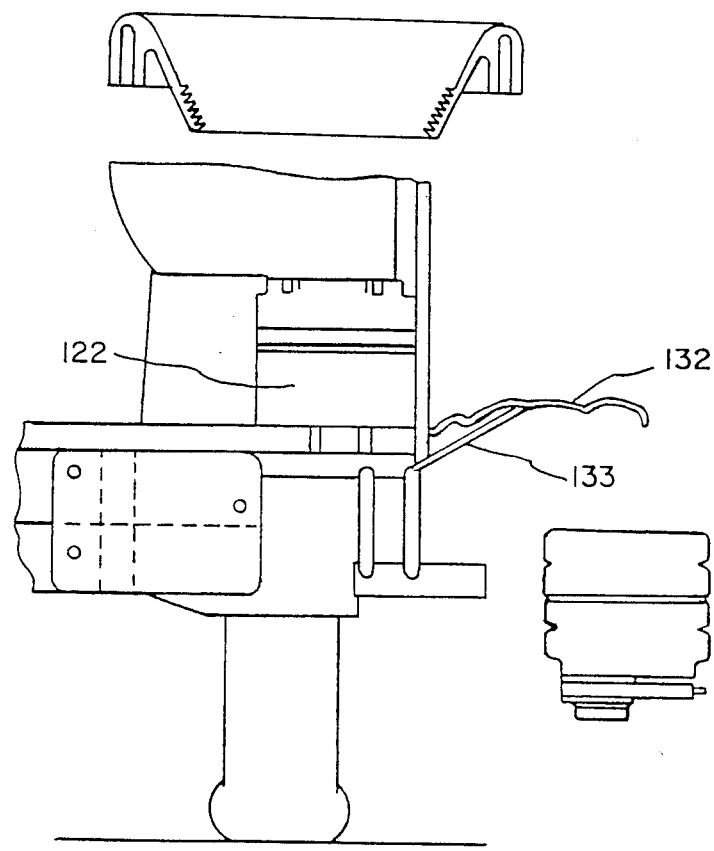
Figure 20A:
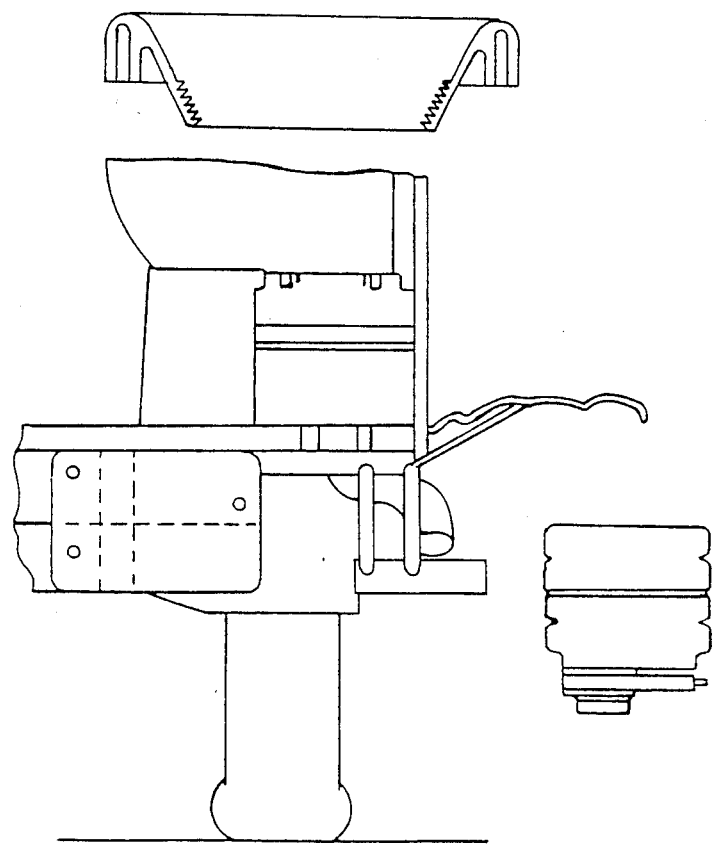
Figure 21:
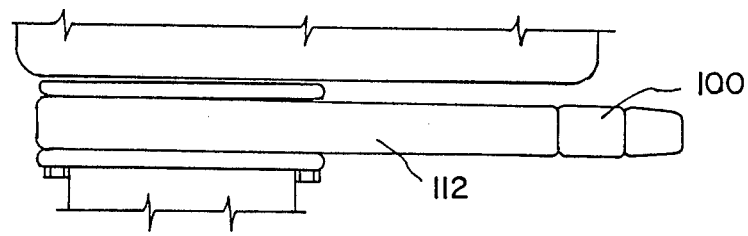
FIGS. 21, 21a and 22, 22a show a longitudinal view and section and a plan view of the gate valve, respectively.
Figure 22:
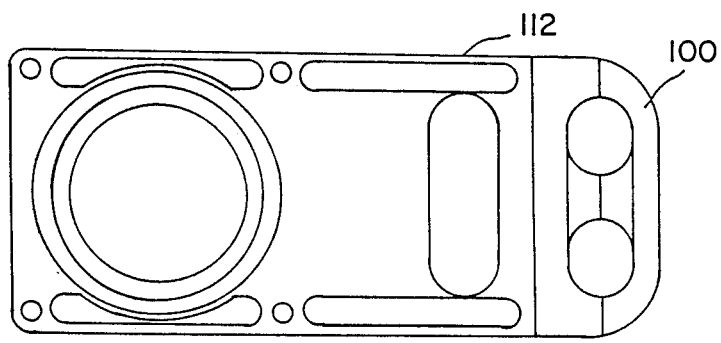
Figure 21A:
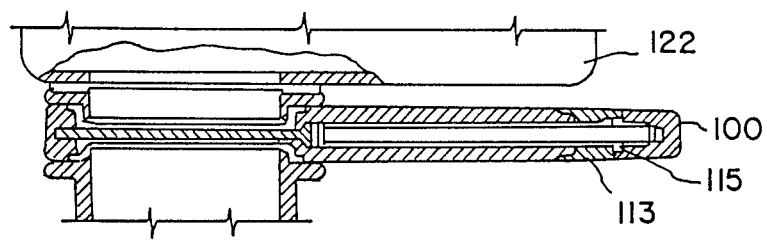
Figure 22A:
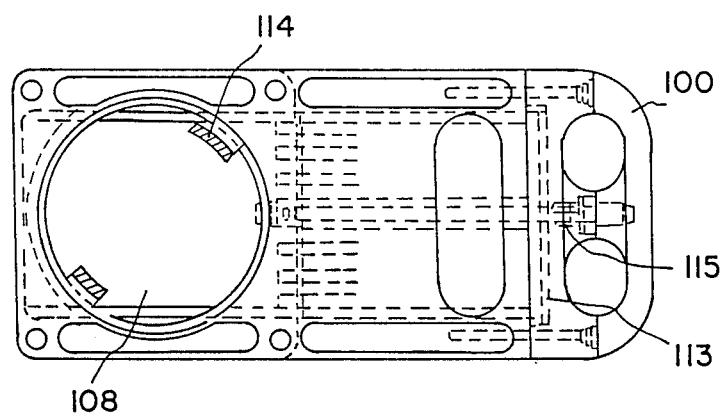

The leak-tightness of a rotating section of pipe with respect to a fixed one has been solved by layers of fixed piping, the effect of which is enhanced by several seals placed in between them (FIGS. 8 and 9).

The operation of the suite of sanitary fittings according to the invention is very simple; in practice the user finds that he has the three most frequently used sanitary fittings available: the washbasin 7, the WC 6 and the shower 8, grouped together on a single platform 1 which, as has already been described, is equipped with suitable elements that enable it to rotate.

In the same axis as platform 1, which is preferably circular in design, is a second fixed platform 9, also preferably circular, which matches moving rotating platform 1 but with a section 10 removed.

By making the rotating platform 1 rotate, the user brings into use one of the three sanitary fittings which is then ready to be used. The second platform 9, which functions as a standing area or shower tray, according to requirements, has outlet 11a for the shower tray and sliding doors 12 and 13 which are the same shape as the fixed platform and which can be closed when required, thus providing a washroom area of considerable size and with the necessary degree of privacy.

When none of the sanitary fittings are to be used the sliding doors 12 and 13 of the shower area mentioned above are placed one over the other and located against the bulkhead 2 which divides the shower 8 from the other sanitary fittings, thus leaving a shower tray defined by second platform 9 completely free so that it can be easily converted into a standing area by means of a false floor or the like.

The area that thus remains free may be used as a passageway, as a dressing room etc., for example.

From the attached drawings it can be seen that if the suite of sanitary fittings described is located in an area in which there is a second or indeed a third free side it is possible to use two or all of the sanitary fittings located on platform 1 at the same time; it is possible, for example, for a child to use the WC 6 whilst the shower 8 is being used or, depending on the position, to use the washbasin whilst the WC is in use.

The suite of sanitary fittings described thus far will preferably be made of glass fiber reinforced plastic, ABS or similar material and therefore all the accessories that are commonly used and which make the suite more pleasant to use, such as soap holder 14, shower attachment 16, grip handles, towel holder, lights, cabinets etc. may be fitted. Individual or centralized mixers for the water may also be fitted according to requirements.

It is clear that in order to avoid undesired rotation, the rotating platform 1 is equipped with suitable locks.

The solutions described may be modified in a number of ways which are illustrated in the attached drawings, such as, for example, the addition of a second fixed platform 15, which provides a solution for a corner, for example, and which enables three sanitary fittings to be used at the same time by allowing a hinged door that matches the washbasin to be fitted or, where the space available is even more restricted, allows the use of the "gesnet" suite of sanitary fittings which is the subject of earlier patents in the name of the same holder.

It is clear that it is also possible to use suitable electric motors to make the suite mounted on the rotating platform rotate; appropriately controlled, these will allow the platform to stop in any one of the three possible positions.

It is also clear that this suite of sanitary fittings may also be used without any problems in apartments or other buildings; only a number of modifications dictated by the particular needs of the sector would be required and considerable time would be saved in manufacture, as the suite is completely prefabricated, and in installation, as all that is required is to connect it to the supply and discharge pipes.

As already mentioned, major improvements have been made both to the discharge valves and to the collecting tanks. With particular reference to FIGS. 7B, 7C and 17 to 23a, the gate valve according to the invention consists of a flat-disk diaphragm or shutter 108 connected by means of rod 109 to handle 100, joined to rod 109 by means of threading or other screwed elements 111, or different fittings, for example bayonet fittings (not shown), so that if breakage occurs as a result of the force that needs to be exerted in order to open the valve, it is quick and easy to replace because it is sufficient to unscrew it and fit a new one.

The housing, 112a, which surrounds the shutter is equipped with four slot-shaped holes 112 which both provide interchangeability with other valves and enable the valve in question to be fitted with ease to the majority of tanks and WCs on the market.

Figure 23:
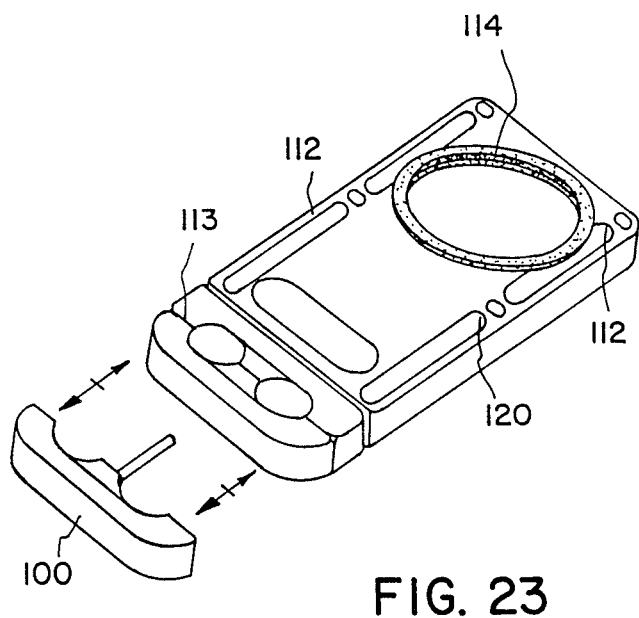
FIG. 23 shows an axonometric and exploded view of the gate valve housing.
Figure 23A:
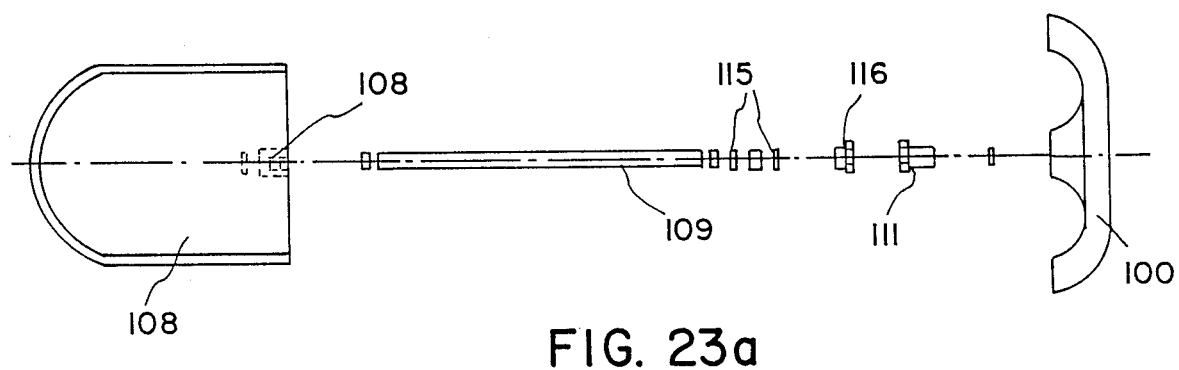
FIG. 23a shows an exploded view of the internal diaphragm complete with rod and handle.

FIGS. 23 and 23a respectively show an axonometric general view and an exploded view of the gate valve. Suitable seals 113, 114 and 115 are provided both along the front edge of the housing and on two opposite sides of the internal diaphragm and along rod 109 to match the handle, these latter seals being retained by a threaded ring nut 116 and its spacer ring.

As can be seen from FIGS. 7c, 17 and 17a, 18, 18', 18a, 18'a, 19, 19a, 19', 19'a, 20, 20a, the lower WC tank of a camper or caravan is, according to the invention, mounted on a support consisting of a section of rectangular design 200 which is joined to the underside of the floor or the associated top section by means of screws or other similar fixing devices. Four connecting rods 119, two per section, are pivot-mounted onto upper section 120 at the top and onto support 121, onto which tank 122 is slid, at the bottom.

The bottom support 121 is shaped in such a way that the two arms fit into the grooves on tank 122, forming a guide and preventing any upward or downward movement. An automatic quick-action lock with conical pin 123 can easily be operated with handle 124 which catches onto conical pin 123 secured onto tank 122 and allows the tank to be locked into its normal operating position or unlocked out of it with speed.

As can be seen from the attached drawings the upper and lower tanks 122 are specular and are connected with each other with appropriate connectors 125 equipped with seals 126, 127 which ensure complete leak-tightness together with connector 130 which controls the height according to the various floor thicknesses. Alternatively, the tanks may be connected by means of corrugated hoses 128 or other similar devices equipped with quick-action couplings 129.

In the bottom of the tank is the discharge hole with the associated gate valve complete with plug and seal 131.

In the position of use the bottom tank is perfectly located in the appropriate housing provided on the camper or caravan and is accessible from the outside. In this position, operating the gate valves 131a described above will enable the contents of the upper tank to flow into the lower one or, on the other hand, to keep them in communication with each other and partially or completely empty them with the lower valve 131. The connecting rods with which the support is articulated point upwards and towards the inside of the camper.

Opening the door (132) on the side of the camper gives access to the compartment, the door being kept open by the shaped rod (133) which catches against the lock on the inside of the door. This rod 133 usually surrounds the lower tank 122 when it is inserted in the usual way, thus providing an additional guarantee of connection in transit and hence a further assurance that the entire system described above is leak-tight. By operating the handle 124, and hence the automatic quick-action lock with conical pin 123, the lower tank can then be disconnected from its normal operating position. At this point and by means of the appropriate shackle on the tank, it is pulled outwards, the connecting rods (119) adopt a vertical position with respect to the floor of the camper and the tank comes completely out of the compartment, dropping down and coming away from the compartment itself. In this position it is extremely simple to release the flexible connecting pipe 128 complete with quick-action connectors 129 to the upper tank and then to remove the tank from the guides 121 so as to transfer it, by means of the wheels if necessary, to the communal facilities where it can be emptied. It is clear that the operations required to put the tank back into its housing and reconnect it to the upper tank are exactly the reverse of the operations just described and equally as simple.

In the version with the quick-action connectors 125 and 130 and associated seals 126, 127 this operation is even more simple, in that as the tank drops down the connection between the two tanks is automatically disconnected.

From that which has been described and illustrated so far it is clear that the improvements according to the invention enable an operation that is necessary to the functioning of the sanitary fittings of campers, caravans and the like to be carried out with greater speed and less inconvenience.

I claim:

1. A sanitary suite for use in campers, caravans and the like wherein the suite comprises: an enclosure, a rotatable platform within the enclosure and divided into three sections each supporting a sanitary fitting selected from the group consisting of toilet bowls, wash basins, and showers, the platform supporting sliding doors slidably positioned along the periphery and including a bulkhead of suitable height and divided into three panels, each of which separates one sanitary fitting from the others for supporting other elements necessary to the operation of the sanitary fittings and to the comfort of the user.

2. A sanitary suite as claimed in claim 1 wherein, in the same plane as the rotating platform there is a second, fixed platform which corresponds substantially in size with the rotating one but with a section removed to permit the rotating platform to rotate relative to the fixed platform, and wherein the fixed platform supports sliding doors along the periphery.

3. A sanitary suite as claimed in claim 1, wherein the suite includes rotatable support means positioned in contact with the underside of the rotating platform which allow rotation and prevent potential imbalances in the rotatable platform when any of the sanitary fittings is in use.

4. A sanitary suite as claimed in claim 1, including sealed rotary joint means having balls which slide between adjacent housings to provide a rotatable connection at a fixed pipe carried by the enclosure and a pipe carried by the rotatable platform, and sealing means for providing leak-tightness of the rotating section of pipe with respect to the fixed one.

5. A sanitary suite as claimed in claim 1, including a second platform adjacent to and lying in the same plane as the rotatable platform, which allows more than one sanitary fitting to be used at the same time.

6. A sanitary suite as claimed in claim 1, including gate valve means placed in between an upper discharge tank and a lower tank of a WC carried by the rotatable platform, wherein the gate valve means includes a flat-disk diaphragm, with associated limit mark which protects it and prevents any undesired opening, connected by a rod to a handle which is joined to the rod by connection means that allow rapid replacement.

7. A sanitary suite as claimed in claim 6, wherein a one-piece, non-deformable housing surrounds the diaphragm of the said valve means and includes slot-shaped holes to provide interchangeability with other valves and enable the valve means in question to be fitted with ease to sanitary fittings, and seals are provided along the front edge of the housing, on two opposite sides of the internal disphragm and to match the handle, and the diaphragm and the inside of the housing also have a flexible lock which prevents the valve means from opening accidentally.

8. A sanitary suite as claimed in claim 1, wherein a lower rank of a WC is mounted on a support including a section of rectangular design which is joined to the underside of a floor or an associated top section by securing means, and connecting rods are pivot-mounted onto the said top section and the support onto which the tank is slid and is hinged to the connecting rods.

9. A sanitary suite as claimed in claim 8, wherein the support, articulated by means of the connecting rods, allows the lower tank to be moved outwards, thus facilitating its removal and replacement after it has been emptied.

10. A sanitary suite as claimed in claim 8, including automatic quick-action lock means with a conical pin, which lock means is easy to operate with a handle which catches onto a conical pin on the tank and allows the tank to be locked into its normal operating position or unlocked out of it with speed.

11. A sanitary suite as claimed in claim 8, wherein the upper and lower tanks are specular and are connected to each other with appropriate connectors with seals that ensure complete leak-tightness.

12. A sanitary suite as claimed in claim 1, including prefabricated "gesnet" sanitary fittings.

13. A sanitary suite as claimed in claim 1, wherein the rotatable platform includes locking means to prevent undesired rotation.

14. A sanitary suite as claimed in claim 1, wherein the sliding doors in a first sanitary fitting area that includes a shower are placed one over the other and located against the bulkhead which divides the shower from the other sanitary fittings, thus leaving a shower tray completely free.

* * * * *